Oct. 14, 1952        L. M. POTTS        2,613,809

TICKET SORTING APPARATUS

Filed Oct. 25, 1946        9 Sheets-Sheet 1

INVENTOR
LOUIS M. POTTS, DECEASED
MARTHA W. C. POTTS, EXECUTRIX
BY Emery Robinson
ATTORNEY Oct. 14, 1952 L. M. POTTS 2,613,809
TICKET SORTING APPARATUS
Filed Oct. 25, 1946 9 Sheets-Sheet 2

INVENTOR
LOUIS M. POTTS, DECEASED
MARTHA W. C. POTTS, EXECUTRIX
BY Emery Robinson
ATTORNEY Oct. 14, 1952 L. M. POTTS 2,613,809
TICKET SORTING APPARATUS
Filed Oct. 25, 1946 9 Sheets-Sheet 4

INVENTOR
LOUIS M. POTTS, DECEASED
MARTHA W. C. POTTS, EXECUTRIX
BY Emery Robinson
ATTORNEY INVENTOR.
LOUIS M. POTTS, DECEASED
MARTHA W. C. POTTS, EXECUTRIX
BY Emery Robinson
ATTORNEY

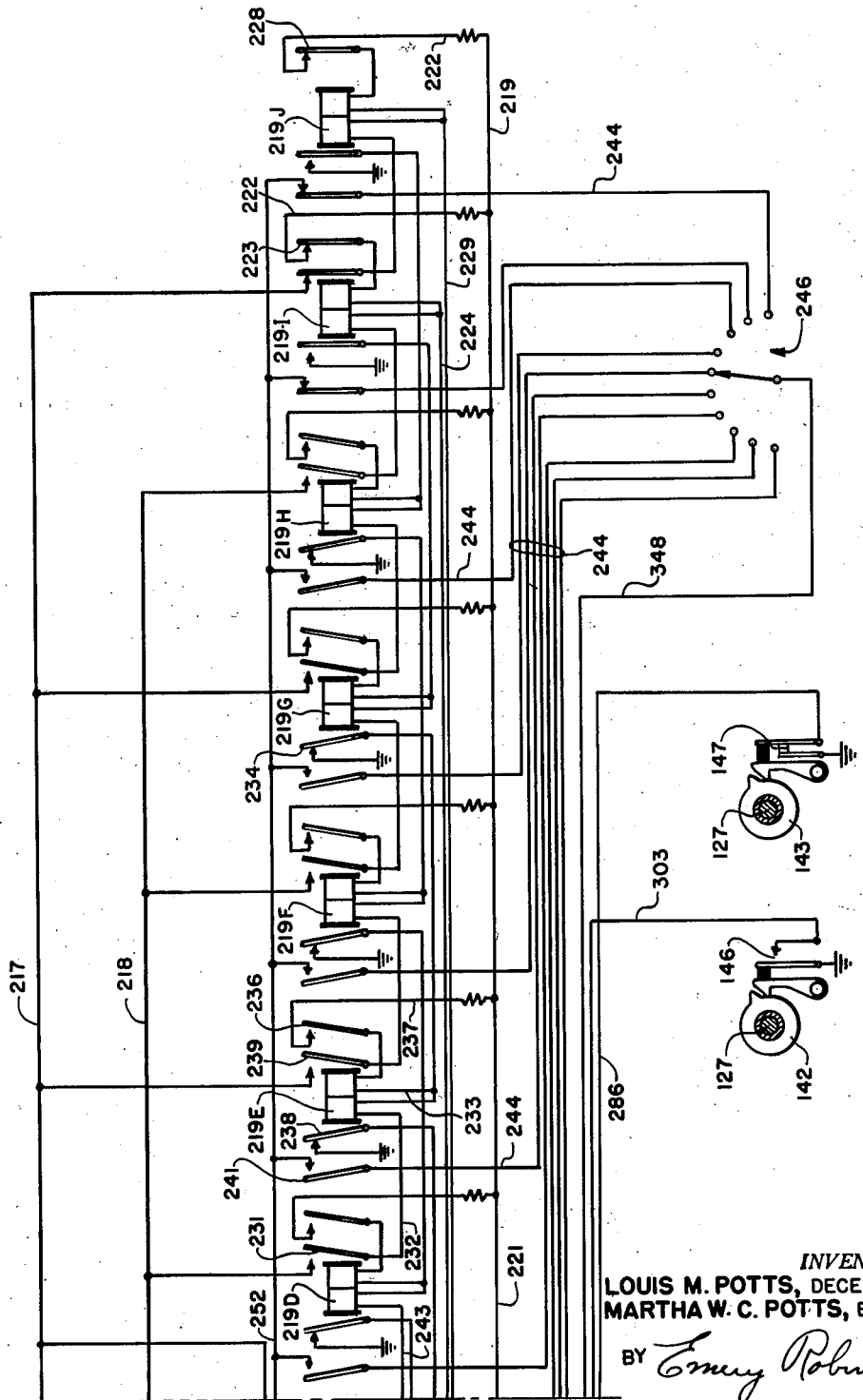

Patented Oct. 14, 1952

2,613,809

UNITED STATES PATENT OFFICE 2,613,809

TICKET SORTING APPARATUS

Louis M. Potts, deceased, late of Evanston, Ill., by Martha W. C. Potts, executrix, Evanston, Ill., assignor to Teletype Corporation, Chicago, Ill., a corporation of Delaware Application October 25, 1946, Serial No. 705,531

5 Claims. (Cl. 209—111)

The present invention pertains to ticket sorting systems, and more particularly to an automatic system for sorting tickets in accordance with designations thereon.

In toll ticketing systems it is desirable to prepare automatically a toll ticket bearing various types of information thereon, such as the number of the calling subscriber, the number of the called subscriber, the time of initiation of the call, the time the call is ended, etc., in order that proper charges may be billed against the calling subscriber. Inasmuch as there may be a great number of tickets bearing charges against many different calling subscribers, manual sorting of such tickets for each subscriber would be a costly and time consuming operation.

Accordingly, an object of the present invention is to provide apparatus for automatically sorting the various tickets as to individual subscribers.

A second object of the invention is to provide automatic ticket sorting apparatus operating in response to designations borne by the tickets.

Another object of the invention is to provide apparatus for scanning the designations on the ticket and operating to control the sorting therefrom.

A further object of the invention is to provide automatic pick-up and conveying apparatus to feed the tickets successively from a stack, convey them past the scanning apparatus, and finally convey them to a predesignated one of a plurality of storage bins.

A still further object of the invention is to provide apparatus which will perform a sorting operation in accordance with any predetermined one of a plurality of rows of coded designations appearing on the toll ticket.

Yet another object of the invention is to provide a one digit sorting device which may be set successively in order to sort toll tickets according to multiple digit numbers.

A further object of the invention is to provide chain relay and tube circuits for controlling the sorting operations.

One further object of the invention is to provide selector mechanism operating under control of the scanning mechanism to cause operation of the various storage bin lids.

The system in general comprises pickup apparatus to feed the uppermost of a stack of toll tickets, conveyor apparatus for feeding the tickets successively past a scanning device, selector apparatus responsive to the scanning for selecting a predetermined sorting storage bin for each ticket, conveying apparatus for feeding the tickets to the various bins and a suitable circuit for controlling the various operations.

A better understanding of the invention may be had from the following detailed description, when read in conjunction with the accompanying drawings, in which Fig. 1 is a plan view, partly in section, showing the ticket pickup device, the scanning and conveyor apparatus, and selector mechanism embodied in the invention;

Fig. 9 is a view showing one of the toll tickets and a portion of the scanning platform;

Figure 15:
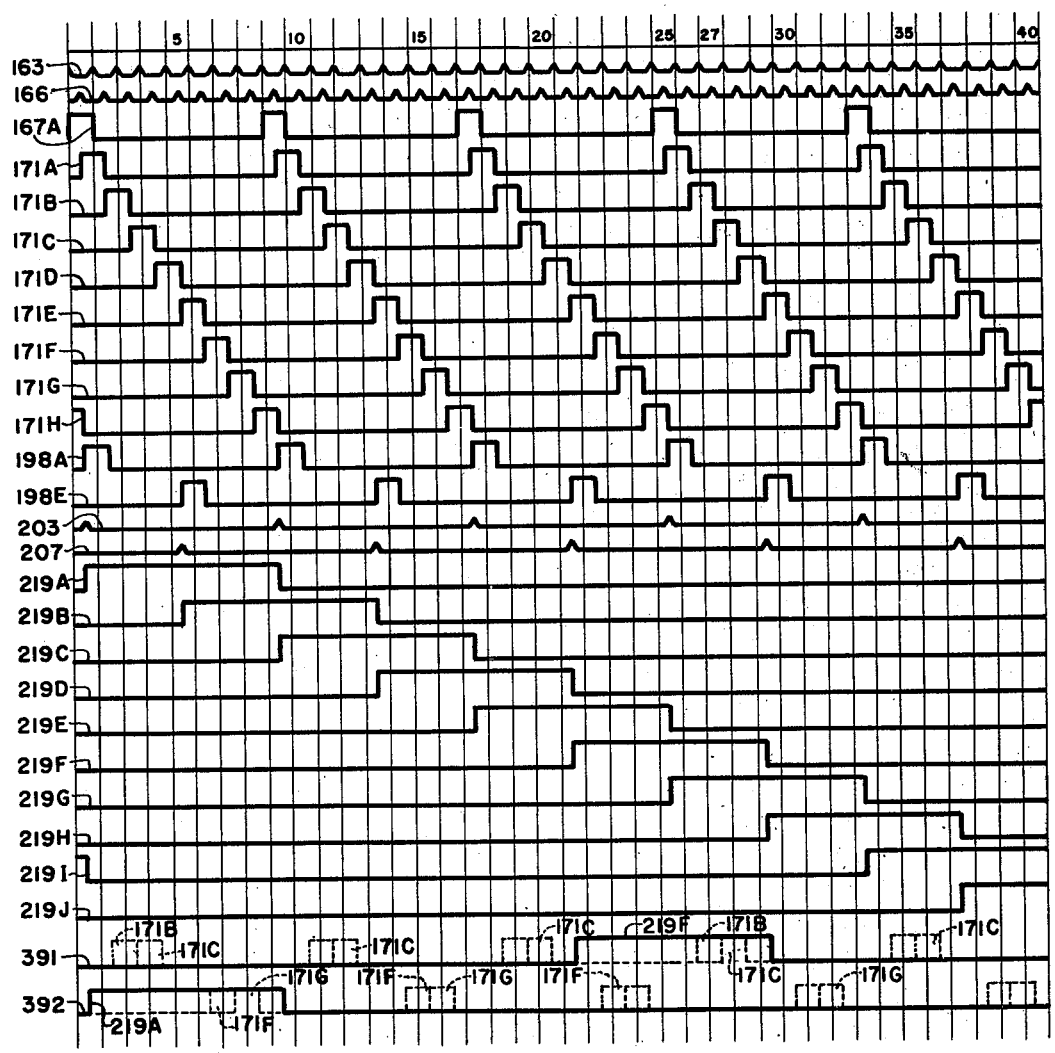

Figs. 10 to 13, inclusive, are schematic diagrams of the circuit embodied in the system;

Fig. 14 is a diagram showing how Figs. 10 to 13, inclusive, should be placed together to form a complete circuit, and Fig. 15 is a timing diagram showing the intervals of operation of various elements of the circuit embodied in the invention.

Figure 1:
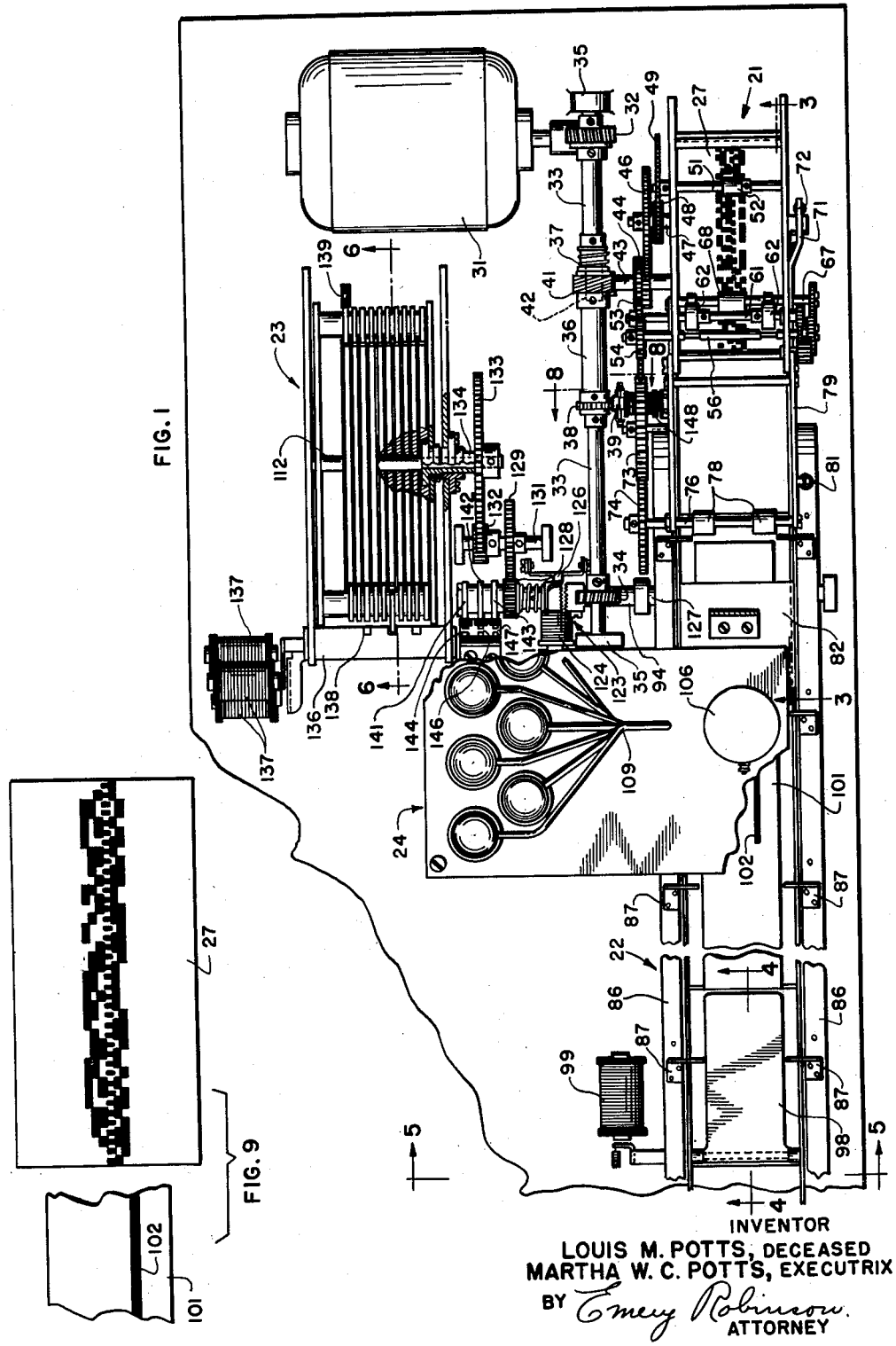

With reference to Fig. 1 of the drawings it may be seen that the apparatus comprises in general a ticket pickup mechanism 21, a ticket conveyor 22, selector mechanism 23 and a scanning and light source mechanism 24.

Figure 3:
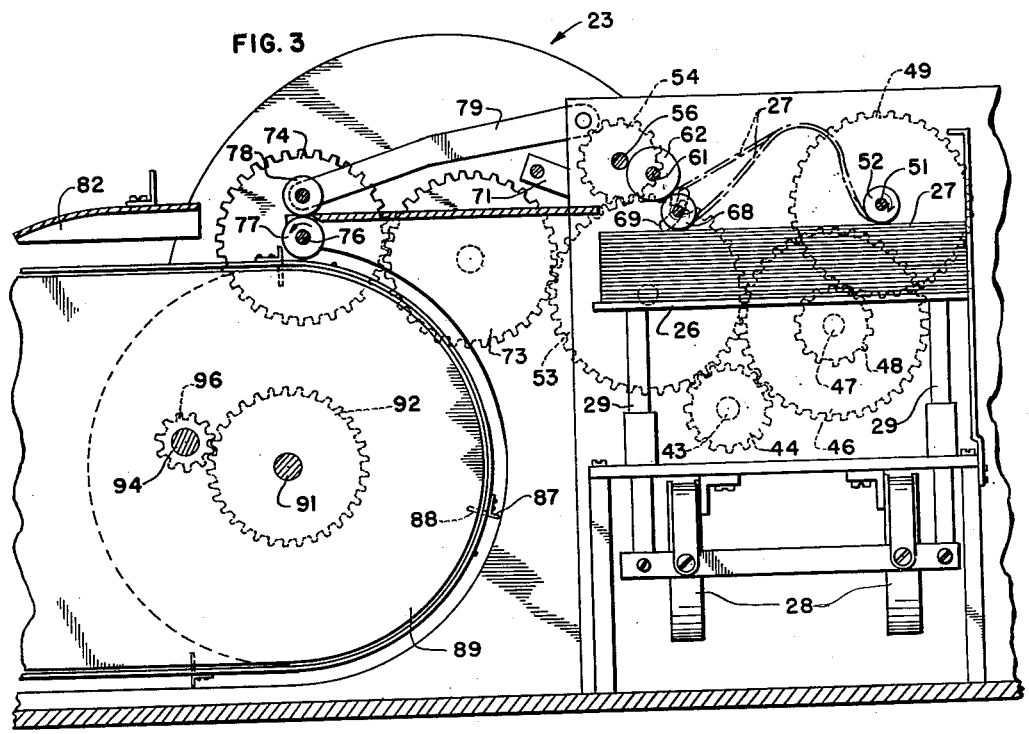
Fig. 3 is an enlarged sectional view taken approximately on the line 3—3 of Fig. 1.
Figure 4:
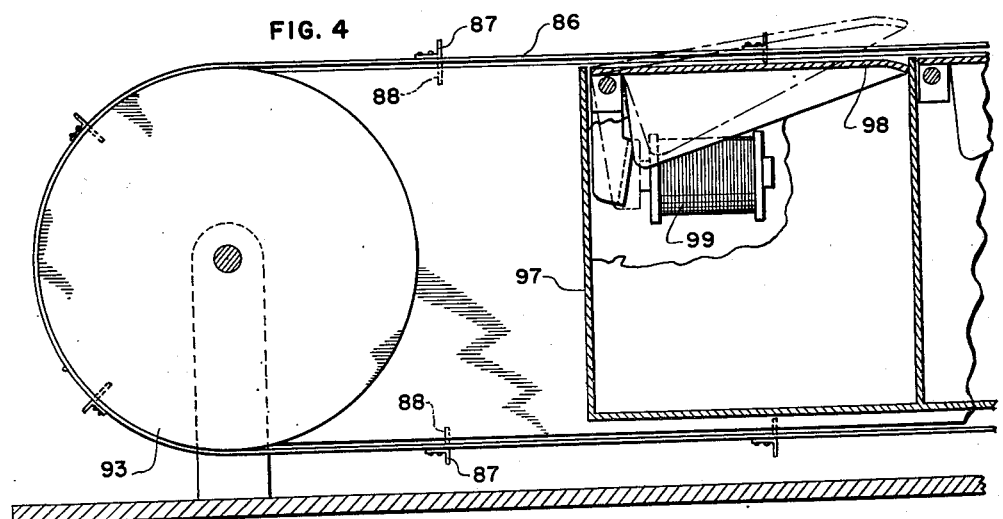
Fig. 4 is an enlarged sectional view taken partly on the line 4—4 of Fig. 1 and also showing the end of the conveyor.

The ticket pickup mechanism 21 comprises, Fig. 3, a table 26 for receiving a plurality of tickets 27 stored one above the other and springs 28 for causing the table 26 and tickets 27 to be urged upwardly, thus always presenting the uppermost ticket to the pickup mechanism. The table 26, as may be seen, is supported by means of supports 29 which are controlled by the springs 28.

Referring again to Fig. 1, a motor 31 is provided which through its shaft and associated gear drives a gear 32 secured to a shaft 33, journaled in bearings 35. Secured about the shaft 33 is a sleeve 36 which is driven by means of a clutch 37 when its ratchet 38 is released by its associated pawl 39, seen more clearly in Fig. 8. Thus, while the shaft 33 may be rotating continuously the sleeve 36 will only rotate when the pawl 39 releases the ratchet 38 and allows the clutch 37 to impart rotation to the sleeve. Secured to the sleeve 36 is a gear 41 which engages an associated gear 42 on stub shaft 43. The shaft 43 is provided with a gear 44 secured to its opposite extremity so that when the sleeve 36 is released the gear 44 will be driven.

Referring now to Fig. 3, it may be seen that when clockwise rotation is imparted to the gear 44 it, in turn, imparts counterclockwise rotation to a meshing gear 46 which is secured to shaft 47, Fig. 1, on which is also secured a gear 48. Gear 48, in turn, when rotated in a counterclockwise direction, Fig. 3, imparts clockwise rotation to a meshing gear 49 which is fast to a shaft 51 on which is secured midway thereof a pressure roll 52. The pressure roll 52 is designed to coact with and engage one end of the uppermost toll ticket 27, in a manner which will be described hereinafter.

Also meshing with the gear 44 is a gear 53 which will be rotated in a counterclockwise direction and which will impart clockwise rotation to meshing gear 54 secured to shaft 56. The shaft 56 extends the width of the ticket pickup mechanism 21 and has secured to its opposite extremity, on the opposite side of the ticket pickup mechanism, a gear 57, shown more clearly in Fig. 2, which will likewise be rotated in a clockwise direction. The gear 57 meshes with a gear 58 positioned on a stub shaft which in turn meshes with a gear 59 which is secured to a shaft 61 extending across the width of the pickup mechanism. The shaft 61 is provided with pressure rolls 62, Figs. 1 and 3, which act to exert pressure on the opposite extremity of the toll ticket from the pressure roll 52 in order to move it from its pile, in a manner which will be described hereinafter.

Also meshing with the gear 57 (Fig. 2) is a gear 63 which will be rotated in a counterclockwise direction and which in turn meshes with a gear 64 rotatable in a clockwise direction. The gear 64 meshes with and imparts rotation to a gear 66 in a counterclockwise direction, the gear 66 being secured to a shaft 67 which extends across the pickup mechanism 21. The shaft 67 has positioned midway thereof a pressure roll 68, Figs. 1 and 3, which engages with the uppermost of the stacked tickets 27 at the extremity opposite from the roll 52 in a manner to be later described.

Figure 2:
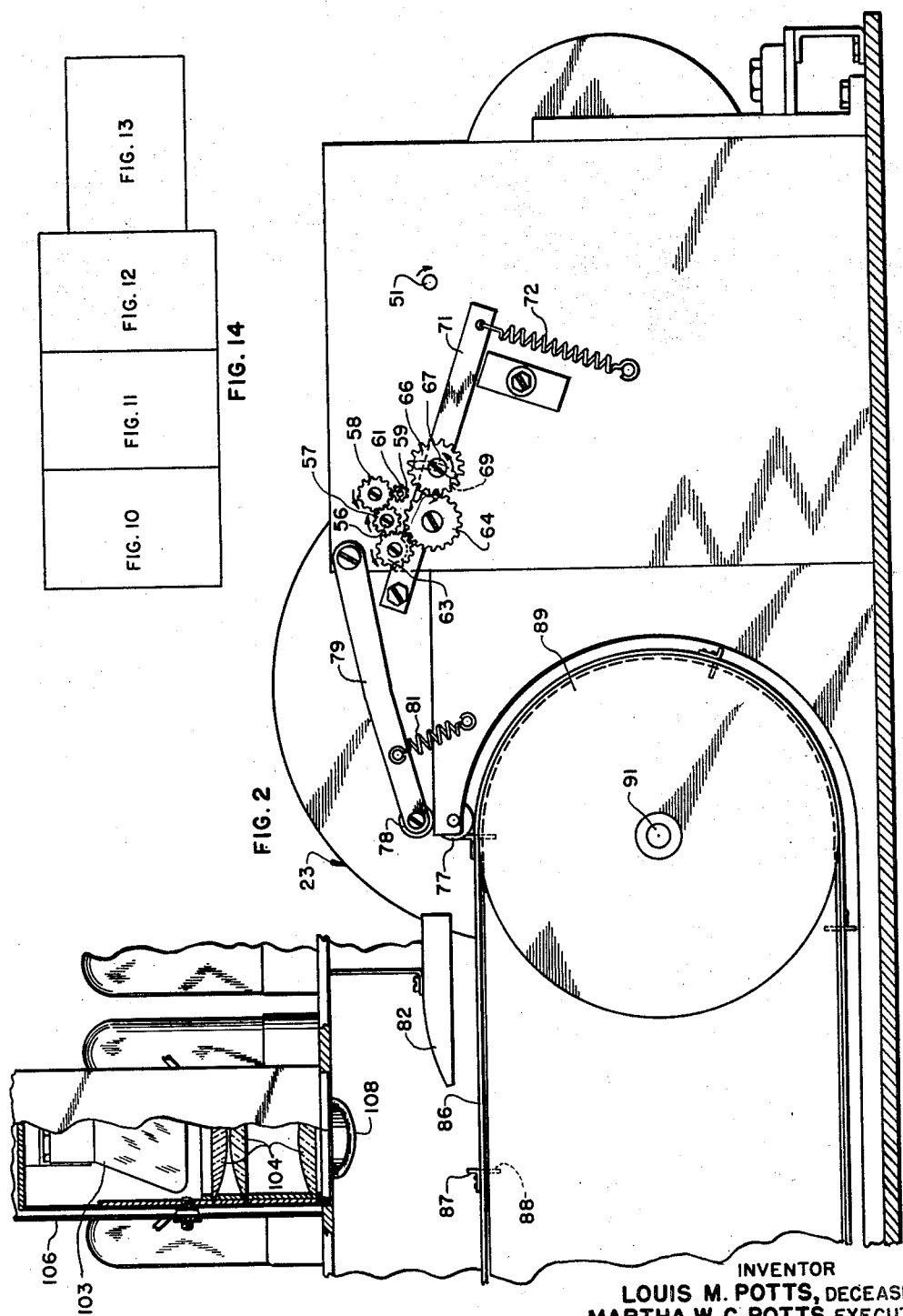
Fig. 2 is an enlarged front view, partly in section, of a portion of the apparatus shown in Fig. 1.

It may be seen in Figs. 2 and 3 that the shaft 67 is secured in arcuate apertures 69 in the framework of the ticket pickup mechanism and is carried on pivoted supports 71 normally urged in a clockwise direction by springs 72, only one of which is shown. The reason for such mounting of the shaft 67 is to insure that the pressure roll 68 will always be in pressure engagement with the uppermost of the tickets 27 in the stacked pile.

Inasmuch as all of the gearing described above is under the control of the sleeve 36, which does not operate continuously but only operates when the pawl 39 is released from the ratchet 38, Fig. 8, the successive picking up of tickets 27 from the pile will not be continuous but will be intermittent and under the control of apparatus to be described hereinafter. However, if it is assumed that the described gearing and pressure rolls are in operation it may be seen, with reference to Fig. 3, that as the pressure roll 52 rotates in a clockwise direction it engages the rearward extremity of the uppermost of the tickets 27 and feeds it forwardly causing it to buckle in the middle in an upwardly direction. Likewise, as the pressure roll 68 is rotated in a counterclockwise direction it engages the forward extremity of the uppermost of the tickets 27 urging that extremity rearwardly and resulting in further buckling of the ticket in the middle, as may be seen in the lowermost of the two dotted line positions of Fig. 3. As the pressure roll 68 continues to move in a counterclockwise direction it will cause the forward extremity of the uppermost ticket 27 to follow the contour of the roll to a position whereat it will be engaged by the pressure roll 62 engaging the roll 68, and rotating in a clockwise direction, as illustrated in the uppermost of the dotted line positions. Thus, the ticket 27 will be fed positively between the rolls 62 and 68 from its position in the stack, as originally described. Because of the design of the various gears in the mechanism and the resulting different operating speeds the foremost end of the uppermost ticket will be positioned between the two rotating rolls 62 and 68 before such time as the rearmost extremity is fed past and released from the pressure roll 52.

Referring still to Fig. 3, it may be seen that the gear 53 is provided with a companion meshing gear 73 which, in turn, meshes with a gear 74 positioned on a shaft 76. Shaft 76 extends laterally across the pickup mechanism 21, Fig. 1, and is provided with rolls 77 which will be rotated in a counterclockwise direction. A pair of pressure rolls 78 are positioned at the foremost extremity of pivoted links 79, Figs. 2 and 3, which are normally urged in a counterclockwise direction by means of a spring 81. Thus, as a ticket is fed between the rolls 62 and 68 it will be fed to a position whereat its foremost extremity will be picked up by means of the rotating roll 77, the ticket being positively urged thereagainst by means of the pressure rolls 78 and will be discharged to the conveyor mechanism 22 in a manner and for a purpose to be more fully described hereinafter. It might be noted that a guide 82, Figs. 2 and 3, has been provided to guide the ticket 27 to the conveyor system after discharge from the rolls 77 and 78.

With reference to Figs. 1 to 5, inclusive, it may be seen that the conveyor mechanism 22 comprises a pair of spaced belts 86 to which are secured at suitable intervals lugs 87 which are each provided with an inwardly and downwardly extending portion 88 which serves to engage the tickets as will be later described. The conveyor belts 86 pass over a pair of drive rolls 89 secured to a shaft 91 which is provided with a driving gear 92, Fig. 3, secured thereto. The opposite extremity of the conveyor belts 86 pass over a pair of spaced idler rolls 93, Fig. 4.

Figure 5:
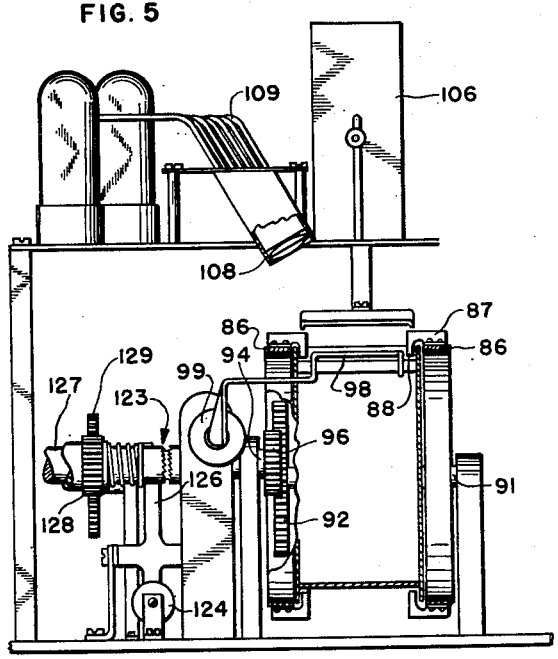
Fig. 5 is a sectional view taken approximately on the line 5—5 of Fig. 1.

Also secured to the shaft 33 is a gear 34 which meshes with an associated gear, not shown, for imparting rotation to a shaft 94 to one extremity of which is secured a gear 96, Figs. 3 and 5. The gear 96 meshes with the gear 92 secured to shaft 91 and insures rotation of the conveyor driving wheels 89.

As the uppermost of the toll tickets 27 is ejected by the driving rolls 77 and the pressure rolls 78 to the conveyor under control of the guide 82 it will be positioned on a table or runway intermediate the spaced conveyor belts 86 and carried along by engagement of the inwardly and downwardly extending portions 88 of the lugs 87. The ticket will thereafter be presented to the scanning mechanism 24 in a manner to be described and finally conveyed to a predetermined one of a plurality of ticket storage bins 97, Fig. 4, which underlie the portion between the spaced conveyor belts 86. As may also be seen in Fig. 4, the tops or lids 98 of the storage bins are each individually pivoted at their rearmost extremity and have a downwardly extending portion which forms the armature for an associated magnet 99. Thus, when one of the magnets 99 is energized, thereby attracting its armature thereto, the lid 98 of the storage bin 97 will be pivoted in a counter-clockwise direction, Fig. 4, to the dotted line position thereby allowing the ticket 27 to be directed into that particular storage bin instead of being carried further along the conveyor system 22.

With reference to Fig. 9 it may be seen that the tickets 27 are of sufficient length to allow the printing thereon of 40 characters, two of which, the first and last on the ticket, will be the code signal for a hyphen. The use of such hyphen code signals will be described hereinafter. The ticket further is provided with feed marks which are half the length of the code marks and which are utilized for feeding control in the system. The use of printed ticket feed marks and the printing thereof may be seen more fully by reference to U. S. Patent No. 2,397,202, issued March 26, 1946, to L. M. Potts. It may be seen that the feed marks, which are half the length of the code marks, are positioned on the ticket 27 midway with respect to the code marks rather than at the beginning thereof, in order to allow better marginal operation of the apparatus, as will become apparent further in the description.

As the ticket 27 is fed by the rolls 77 and 78 to such position whereat it is engaged by the extending portion 88 of the lugs 87 on the conveyor belts 86, it will be fed forward to a table 101 underlying the light source and scanning apparatus. As may be seen in Figs. 1 and 9 the table 101 is formed with a black inlay or portion 102, for a purpose which will be described during the description of the circuit embodied in the invention.

The scanning and light source mechanism 24, Figs. 1, 2, and 5 comprises a light source 103 and a converging lens system 104, all positioned in a light tight case 106. The converging lens system 104 is so designed as to throw a narrow beam of light rays on the table 101 of sufficient width to coincide with a transverse row of code marks of the ticket 27. With reference to Fig. 5, it may be seen that light reflected from the ticket will be picked up by proper lens 108 which direct beams to a plurality of light conducting rods 109, made of Lucite or some similar material. The individual light conducting rods of which there are seven, Fig. 1, lead to individual photocells which are shown generally in Fig. 1 but which will be described more fully and assigned identifying numerals with respect to the description of the circuit.

During the time that the tickets 27 are passed successively across the table 101 and thus under the appropriate light rays the photocells will be activated in accordance with whether a light or dark (white or black) surface is being scanned at that time and reflected to the light conducting rods 109. In accordance with common practice the various code signals are made up of marking or spacing impulses, the spacing impulses indicated as light or white areas on the tickets 27 whereas the marking impulses are indicated as dark or black surfaces on the tickets. Accordingly, five of the photocells will be operated in accordance with the five code impulses, as utilized in the well known Baudot code, whereas a sixth photocell operates in accordance with the feed marks on the tickets and the seventh photocell operates in accordance with whether a ticket is present under the scanning mechanism or whether the black inlay surface 102 in the table 101 will be scanned. By referring to Fig. 9 it may be seen that the inlay surface 102 is offset with respect to the code marks on the tickets 27 and therefore as a ticket passes under the scanning mechanism on the table 101 the black inlay 102 will be covered by the light or white portion of the ticket, whereas if no ticket is present under the scanning mechanism the Lucite rod 109 positioned to receive reflected light from the inlay portion 102 will conduct light in accordance therewith. The various resulting operations from the photocells will be described hereinafter during the description of the electrical circuit.

As the ticket 27 passes from the table 101 it will be conveyed further by the conveyor belts 86, passing over the various lids 98 of the various storage bins 97 until such time as one of the lids 98 is raised in a manner to be described hereinafter.

Figure 6:
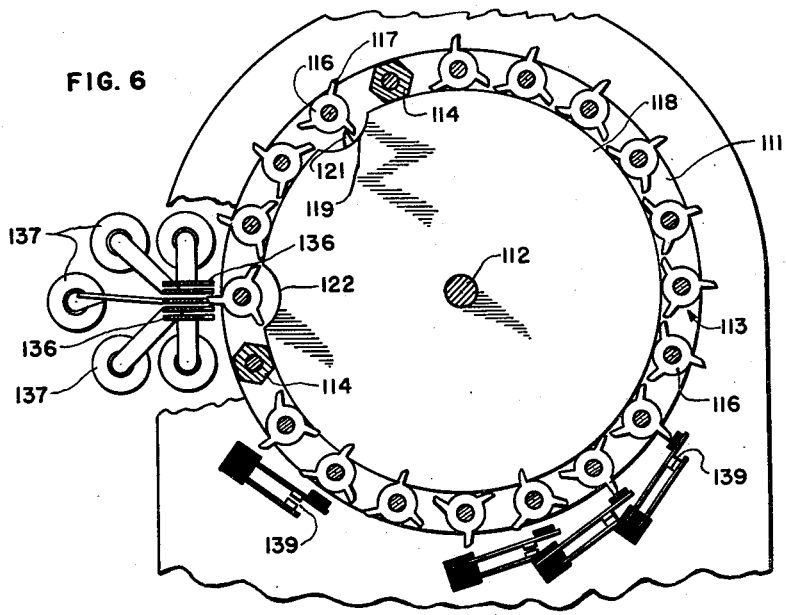
Fig. 6 is an enlarged sectional view, partly broken away, taken approximately on the line 6—6 of Fig. 1.
Figure 7:
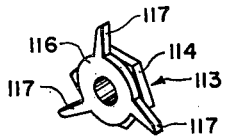
Fig. 7 is an enlarged perspective view of an element of the selector mechanism.

Reference may now be had to Figs. 1, 6, and 7 for a description of the selector mechanism embodied in the present invention. The selector mechanism in general comprises a plurality of ten discs 111 mounted rotatably on a common shaft 112. Each of the rotatable discs 111 is provided with a plurality of settable members 113 thereon, shown in detail in Fig. 7, and which is formed with a hexagonal portion 114 and a round portion 116 having three lugs 117 extending therefrom. The settable members 113 are secured rotatably to the discs 111, the hexagonal portion 114 being adjacent to the disc.

Interspaced between adjacent discs and associated with each of the rotatable discs 111 is a disc 118 which is nonrotatable but which is positioned about the shaft 112. The discs 118 are each provided with a semicircular portion 119 cut from the periphery thereof provided with an upstanding lug 121 in the middle thereof and also with a semicircular portion 122 cut in the periphery of the discs 118 but spaced from the previously mentioned cut 119.

Referring to Fig. 1, it is to be remembered that a shaft 94 was described as being rotated through gear 34 on shaft 33. The shaft 94 has secured at one extremity thereof a driving portion of a standard type clutch indicated generally by the numeral 123. The driven portion of the clutch 123 is released for engagement with the driving portion thereof by the energization of a magnet 124, Figs. 1 and 5, and the subsequent attraction of armature 126. The driven portion of the clutch 123 is secured to a shaft 127 (Fig. 5) which carries a gear 128 thereon which meshes with a gear 129 positioned on a stub shaft 131, suitably journaled (Fig. 1). Also secured to the stub shaft 131 is a gear 132 which meshes with a gear 133 secured to a sleeve 134 positioned about the shaft 112, previously described. Thus, at such time as the magnet 124 is energized and the clutch 123 released rotation will be imparted to the sleeve 134 through the gearing system just described. It might be noted that the sleeve 134 is provided with collar connections to the various rotatable discs 111 in such a manner that the discs 111 will be rotated about the shaft 112.

Referring again to Fig. 6, it should be noted that the settable members 113 rotatably mounted to the discs 111 are held in one position during rotation by a facet of their hexagonal portion 114 engaging the outer periphery of the associated stationary disc 118. However, as the disc 111 moves in a counterclockwise direction to a position whereat the settable member 113 is adjacent the cutout portion 119 in which direction lugs 117 which may have been positioned in such a manner as to engage the lug portion 121, the member 113 will be rotated so as to be free of the cutout portion, as illustrated in the next succeeding member 113. The settable members 113 will then be held in the set position with a lug extending outwardly from the periphery of the disc 111 through the engagement of a facet of the hexagonal portion 114 with the outer periphery of the associated disc 118 until such time as the settable members 113 are advanced to the cutout portion 122.

Positioned adjacent to the code discs 111 are five selector bars 136, Figs. 1 and 6, which are under the control of five associated magnets 137 which are operated in a manner and for a purpose to be described hereinafter. The selector bars 136 are provided with various notches 138 in the rightward edge thereof, Fig. 1, for coding purposes. The various magnets 137 will be energized or not energized in accordance with the code marks scanned, as will be described later, and accordingly will position the five selector bars 136 in permutations according to the scanned code signals. It is sufficient to say at this time that as the various code bars 136 are set in varying permutations a single set of notches 138 will be aligned adjacent to one of the sets of settable members 113 secured to one disc 111 only. Thus when this condition exists, as the discs 111 are rotated further, the settable member 113 having been positioned with its lug extending downwardly, will be allowed to pass through the aligned notches 138 without being moved in position. By the time that the lug 117 is passed through the aligned notches 136 the settable member 113 will be advanced past the circular cutout portion 122 in the periphery of the stationary disc 118 and a facet of the hexagonal portion 114 will have engaged the outer periphery of the disc 118, thereby precluding further rotational movement of the settable member 113, until it is advanced to its neutralizing position adjacent the cutout portion 119. However, in the event that the particular signal scanned and the movement of the selector bars 136 had been such as to have one of the bars blocking a complete alignment of the notches 138 the particular described settable member 113 would be rotated by its outstanding lug 117 engaging the unaligned selector bar 136, thereby rotating the settable member 113 to a position whereat it has one of its lugs 117 extending inwardly and none outwardly, several of which are illustrated. Under this condition, as the disc 111 rotates further the positioned settable member 113 will be locked in place by means of a facet of the hexagonal portion 113 engaging the periphery of the stationary disc 118.

With reference to Fig. 6, it may be seen that a plurality of electrical contact pairs 139 are positioned adjacent to the discs 111, the contact pairs being so positioned that only one will be adjacent to each disc 111 to be operated by any outwardly extending lugs 117 of the settable members 113 on that particular disc. Thus, as a particular disc 111 rotates it will close the associated contact pair 139 each time a settable member 113 passes adjacent thereto which has its lug 117 outstanding, which indicates that the selector bars 136 were so positioned as to have aligned notches 138 adjacent that particular settable member.

The closing of a particular contact pair 139 will result in the energization of an associated one of the magnets 99 for opening the lid 98 of a particular storage bin 97, as will be described hereinafter. It should be noted, however, that the contact pairs associated with each of the ten rotatable discs 111 will be connected one each to the magnets 99 controlling the opening of the storage bins and, therefore, each of the selector discs 111 may be considered as being assigned to a predetermined one of the ten storage bins.

Also secured to the shaft 127, rotatably under the control of the clutch 123, are three cams 141, 142, and 143, which may be seen in Fig. 1 and which are also reproduced in the circuit drawings (Figs. 10 and 13), which operate to control associated contact pairs 144, 146, and 147, respectively, through the action of appropriate cam followers. The cyclic operation of the cams 141 to 143, inclusive, and the subsequent closure of their associated contact pairs will be dealt with more fully in the description of the electrical system embodied in the invention.

Figure 8:
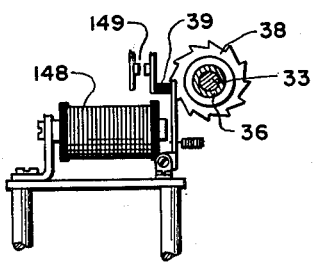
Fig. 8 is an enlarged sectional view taken approximately on the line 8—8 of Fig. 1.

By reference to Fig. 8, it may be seen that the pawl 39, previously described as controlling the release or non-release of the ratchet 38 secured to the sleeve 36, is under the control of a magnet 148 for which it serves as an armature. The pawl 39 is so constructed that when it is in its attracted position due to the energization of the magnet 148 the ratchet 38 will be released for rotation and an associated electrical contact pair 149 will be closed. A complete understanding and interaction of the mechanical elements will become more readily understandable from the following description of the electrical circuit embodied in the invention which will include a synopsis of operations of the entire device. The illustration of such electrical circuit is diagrammatic in nature and may be had by reference to Figs. 10 and 13, inclusive, when placed in the order shown in Fig. 14. Inasmuch as the operation of the various electrical elements for proper functioning of the apparatus must be in timed relation to each other, the description of Fig. 15 will be included with that of the electrical circuit to describe the timing of the various elements.

The timing diagram illustrated in Fig. 15 has been divided into forty portions, corresponding with the forty code columns on the ticket 27; thus, for example, the No. 1 division of the chart shown on Fig. 15 corresponds to the first code signal appearing on the ticket 27, the second the second, etc.

Figure 10:
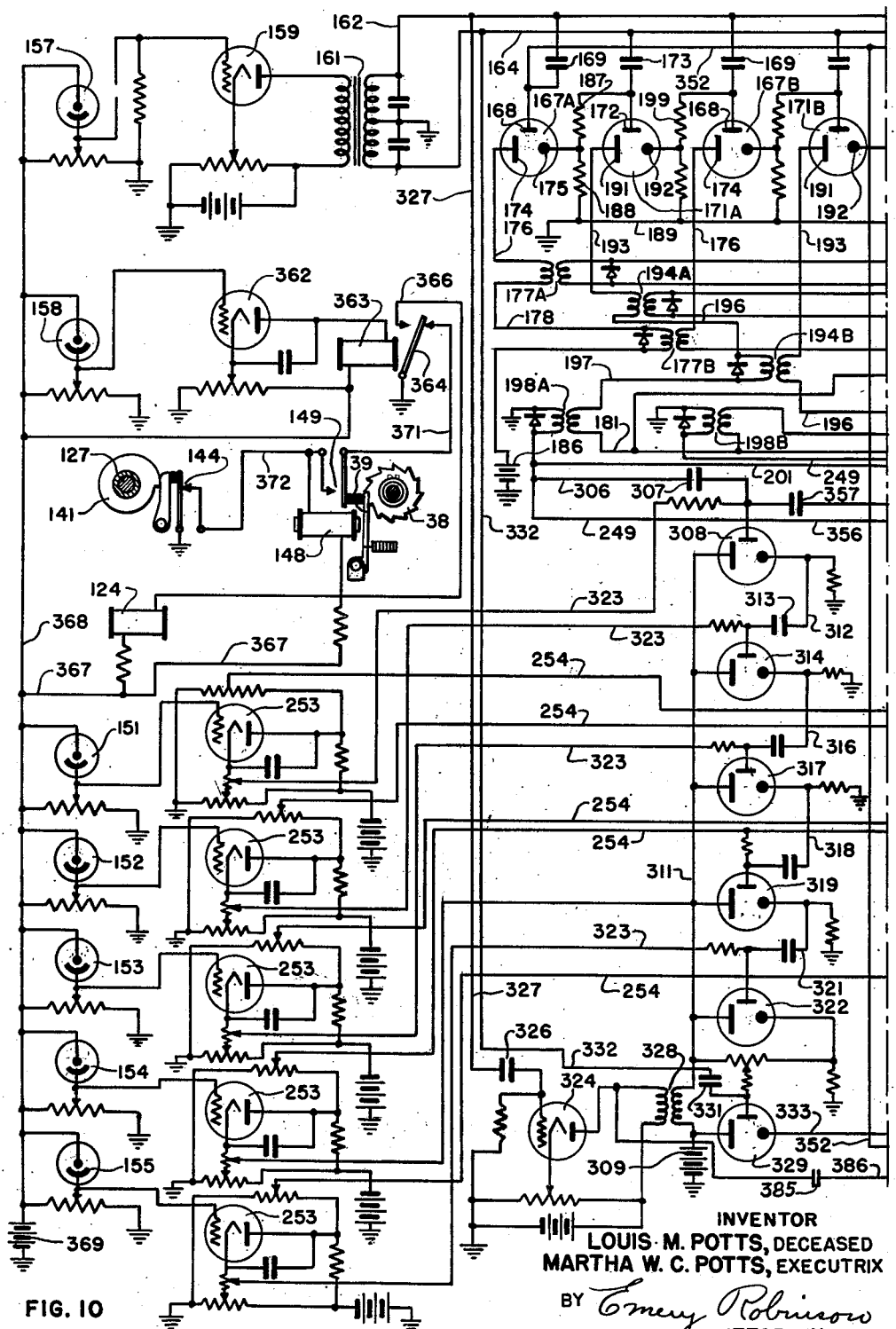

With reference to Fig. 10, it may be seen that the apparatus is provided with five photocells 151 to 155, inclusive, which are utilized and are responsive to the scanning of the five code impulses comprising a code signal. Two additional photocells 157 and 158 are also provided, the photocell 157 being responsive to the printed code feed marks appearing on the ticket 27 whereas the cell 158 is responsive in accordance with whether a ticket 27 is present or is not present under the scanning mechanism.

As a ticket 27 is passed under the scanning mechanism the photocell 157 will be biased accordingly with respect to whether a black or feed mark or white or no feed mark is present on the ticket. An amplifier tube 159 operates in accordance with the biasing of the photocell 157 and controls the primary of a transformer 161 by its output circuit. The secondary of the transformer 161 will be operated in accordance with the operation of the primary of the transformer and the amplifier tube 159 in such a manner as to cause sharp impulses to be transmitted as the photocell 157 operates in response to the scanning of a change of bias; that is, when the scanning changes from the white ticket surface to a black ticket feed mark and again from the black feed mark to the interspaced white portions. As the scanning changes from a white portion to a black feed mark, sharp impulses will be transmitted over a common conductor 162 such as is shown as line 163 of Fig. 15. Likewise, as the scanning changes from the black feed marks to the interspaced white portions of the ticket, the secondary of the transformer 161 will operate to cause sharp impulses to be transmitted over a common conductor 164, such as is shown as line 166 of Fig. 15. Inasmuch as there is a ticket feed mark provided for each transverse row of code impulse signals there will be a continuous alternating succession of impulses on the conductors 162 and 164, as may be seen by a comparison of the lines 163 and 166.

Eight cold cathode tubes designated as 167A to 167H, inclusive, are provided with their starter anodes 168 being connected through condensers 169 to the common conductor 162, over an obvious circuit. Thus, each time that a sharp impulse is generated on the common conductor 162, a similar impulse will be impressed on all of the starter anodes 168 of the tubes 167A to 167H, inclusive. However, such potential is not sufficient in itself to cause the cold cathode tubes to conduct but they must receive a conditioning voltage in order for such to occur, in a manner as will be described hereinafter.

Eight cold cathode tubes 171A to 171H are also provided which have their starter anodes 172 connected through condensers 173, over an obvious circuit, to the common conductor 164. Thus, every time that the sharp impulses are generated on the common conductor 164 they will be impressed to the starter anodes 172 of all of the tubes 171A to 171H. However, such potential is not sufficient to cause any of the cold cathode tubes 171A to 171H, inclusive, to conduct at this time but instead it is necessary that a conditioning voltage or potential be applied to the starter anode 172 simultaneously with the impulse on the common conductor 164 for such to occur, in a manner as will be described hereinafter.

Each of the tubes 167A to 167H, inclusive, are provided with an anode 174 and a cathode 175. The anodes 174 are connected over individual conductors 176 to the primary of commutating transformers 177A to 177H, inclusive, and thence over individual conductors 178 to the secondary of the succeeding commutating transformers, such as the primary of transformer 177A and secondary of the transformer 177B, and finally to a common conductor 181 leading to grounded battery 182 through the armature 183 of a slow-to-operate relay 184 and over a conductor 185.

It should be noted, however, that the above statement of the anodes 174 being connected to the common conductor 181 is true for the tubes 167B to 167H, inclusive, but that the anode 174 of the tube 167A is connected over its conductor 176 to an individual grounded battery 186. The reason for such will appear hereinafter.

The cathodes 175 are connected through resistors 187 to the starter anodes 172 of the succeeding tubes 171A to 171H, inclusive, and also through the resistors 188 to a common grounded conductor 189.

The tubes 171A to 171H, inclusive, are also each provided with an anode 191 and a cathode 192.

The anodes 191 are connected over individual conductors 193 to the primaries of commutating transformers 194A to 194H, inclusive, over conductors 196 and through the secondary of the next succeeding commutating transformer, over individual conductors 197 and through the primary of transformers 198A to 198H, inclusive, to the common conductor 181 leading to grounded battery 182.

The tubes 167A to 167H, inclusive, will be conducting in staggered relation, the line 167A, Fig. 15, showing the firing or conducting of the tube 167A.

The tubes 171A to 171H, inclusive, will also fire successively or in staggered relation, the lines 171A to 171H, inclusive, showing the conducting or firing characteristics of the tubes bearing similar numerals.

By comparison of the lines 167A and 171A it may be seen that the tube 167A will be conducting during a portion of the time that the tube 171A is conducting, as seen charted on line 171A, and also during a portion of the time that the tube 171H is conducting, as may be seen by referring to the line 171H. Thus, from this comparison and a comparison of succeeding tubes if the remainder of the characteristics of the tubes 167A to 167H, inclusive, were charted, it would become apparent that one each of the tubes 167 and 171 will be conducting simultaneously and thereafter the 167 type tube being extinguished and the next succeeding 167 type tube being fired; in other words the system provides a chain tube system wherein the tubes will advance successively conducting and the second tube back becoming extinguished, as will appear presently. In the following description of the operation of the tubes 167 and 171 it will be assumed that the tubes 171A and 167A are conducting and the remainder of the tubes are extinguished. Such initiation of the chain tube system may be had by the use of manually operated contacts for impressing sufficient firing potential to the starter anode of any one or more tubes. The general application of the method of initiation of tubes may be had by reference to Reissue Patent No. 21,778, issued to L. M. Potts on April 22, 1941.

Under the above operating condition, with the tubes 171A and 167A conducting and with a ticket 27 being conveyed to scanning position, the operation of tube 157 in response to the change from the white portion of the table 101 to the first black ticket feed mark will result in impulses being impressed on the common conductor 162 by the secondary of the transformer 161, as previously described and thus through the condensers 169 to the starter anode 168 of each of the tubes 167A to 167H, inclusive. During the firing of the tube 171A a circuit may also be traced from grounded battery 182 (Fig. 11) to the anode 191, to the cathode 192, and through a resistor 199 to the starter anode 168 of the tube 167B. This potential impressed on the starter anode 168 of the tube 167B serves as a conditioning potential for that particular tube. Inasmuch as only the tubes 167A and 171A are conducting at this time and as the output circuit from the cathode 175 of the tube 167A passes through the resistor 187 to the starter anode 172 of the tube 171A which is already conducting, and as the cathode circuit 192 of the tube 171A passes through the resistor 199 to the starter anode 168 of the tube 167B, the tube 167B will be the only one of all of the tubes 167 and 171 which will receive a conditioning potential at this particular time. Since the starter anode 168 of the tube 167B is receiving its conditioning potential from the preceding tube 171A during the time that this latter tube is firing, at such time as the impulse is generated on the common conductor 162 by the secondary of the transformer 161, which is added to the conditioning potential applied to the starter anode 168 of the tube 167B, it will cause the tube 167B to fire or become conducting.

Inasmuch as the anode 174 of the tube 167B is connected over conductor 176 to the primary of the commutating transformer 177B, upon the firing of the tube 167B the potential will be reversed on conductors 178 and 179 leading to the anode 174 of the tube 167A due to the action of the secondary of the transformer 177B resulting in the tube 167A becoming extinguished. Likewise, the anode of the tubes 171A to 171H, such as anode 191 of the tube 171B, is connected over conductors 193 to the primary of the commutating transformers 194A to 194H, such as transformer 194A, so that, for instance, as the tube 171B conducts the potential will be reversed on conductors 196 and 193 leading to the anode 191 of the tube 171A due to the action of the secondary of the transformer 194B resulting in the tube 171A becoming extinguished. Thus, it may be seen that each time one of the tubes 167 or 171 becomes conducting it conditions the next succeeding tube of the opposite type and extinguishes the preceding tube of the same type.

During the time that one of the tubes 171A to 171H, inclusive, is conducting it will result in the pulsing of the associated transformer 198A to 198H, inclusive, respectively, for a purpose to be described hereinafter. The operation or pulsing of the transformer 198A has been illustrated as line 198A of Fig. 15 and the pulsing of the transformer 198E has been illustrated by line 198E of Fig. 15.

The secondary of the transformer 198A is grounded and is connected over a conductor 201 and through a condenser 202 (Fig.12) to the starter anode of a cold cathode tube 203. Likewise, the secondary of the transformer 198E is grounded and is connected over a conductor 204 and through a condenser 206 to the starter anode of a cold cathode tube 207. The starter anodes of the two tubes 203 and 207 are normally supplied with conditioning potential from grounded battery 208 over a conductor 209 to a junction point 211 and thence over a conductor 212, through an armature 213 of a slow-to-operate relay 214, and over a conductor 210 to battery, so that in the event that a pulse is generated on one of the conductors 201 or 204 it will be sufficient to cause the particular tube 203 or 207 to become conducting.

The anodes of the tubes 203 and 207 are connected to the windings of a transformer 216 which is utilized to allow only one of the tubes 203 or 207 to be conducting at any one time, the firing of the one tube resulting in the extinguishment of the other tube.

The output of the tube 207 is timed impulses, such as illustrated on line 207 of Fig. 15, which are impressed on a common conductor 217, whereas the output of the tube 203 is similarly spaced impulses, as illustrated on line 203, Fig. 15, which are impressed on a common conductor 218.

Ten relays 219A to 219J, inclusive, are provided, each being double wound for a purpose to be later described. In the following description of the relays it will be assumed that the relays 219I and 219J are energized, the remainder of the relays being unenergized. While the initiation of the various relays has not been illustrated but the assumption made that two of them are energized as a starting point, the general manner for initiating such relays may be more readily understood by reference to the above mentioned reissue patent.

It might be noted at this point that the relays 219A to 219J, inclusive, operate in such a manner that two adjacent ones of the relays are energized simultaneously, with the exception of the first and last relays 219A and 219J, one thereafter being de-energized and the next succeeding relay becoming energized. The interval of energization of the various relays 219A to 219J, inclusive, may be had by reference to lines 219A to 219J of Fig. 15. Following the assumption that the relay 219I is energized the locking circuit may be traced from positive battery 208, over the conductor 210, through the armature 213, over the conductor 212 to junction point 211, over common conductor 221, over a branch conductor 222, through the armature 223 associated with the relay 219I, now in its attracted condition, through the right-hand winding of the relay 219I, over a conductor 224, through the armature 226 of the relay 219A which will be in its unattracted condition, to ground 227. Thus, the relay 219I will remain in its energized condition at this time. With respect to the relay 219J, also assumed energized at this time, its locking circuit may be traced from the battery 208, over the conductor 210, through the armature 213, over the conductor 212, over the common conductor 221, over a branch conductor 222 (Fig. 13), through the armature 228 of the relay 219J, now in its attracted condition, through the right-hand winding of the relay 219J, over a conductor 229 and through now unattracted armature 231 of the relay 219B, to ground. Thus, the relay 219J will also remain in its energized condition.

When during the time that the relays 219I and 219J are energized the tube 171A becomes conducting, it results in potential being impressed across the primary of the transformer 198A with the resulting impulse being generated on the conductor 201 from the secondary of the transformer causing the tube 203 to become conducting and an impulse to be generated on the common conductor 218, all as has been described. As a result of such pulse on the conductor 218 a similar impulse will be impressed on its branching conductors leading to alternating ones of the relays 219A to 219J, inclusive, but will only have effect with respect to the particular relays to which a branch conductor circuit is completed; that is, the relay energized at that time.

However, as there is no circuit from the relay 219J to the relay 219A none of the other relays 219 will be energized at this time. The method for energizing the relay 219A will be described hereinafter. If for example, the relay 219D had been energized at this time the pulse on the conductor 218 would pass over the branch conductor to the then attracted armature 231 of the relay 219D, over a conductor 232, through the left-hand winding of the relay 219E, over a conductor 233, and through the unattracted armature 234 of the relay 219G, to ground. The relay 219E would thus energize. A locking circuit would be established from ground, through the armature 234 of the relay 219G, over the conductor 233, through the right-hand winding of the relay 219E, through the now attracted armature 236, over the conductors 237, 221, 212, through the armature 213 of the relay 214, Fig. 11, and through the conductor 210 to grounded battery 208.

At the time that the relay 219E becomes energized its armature 238 will be attracted thereto, which will result in ground which had previously been supplied through the unattracted armature 238 and which served as a locking circuit for the relay 219C to be removed resulting in the relay 219C becoming de-energized.

The energization of the relay 219E also results in its armatures 239 and 241 being attracted thereto. The attraction of the armature 239 results in a circuit being conditioned over an associated branching conductor to the common conductor 217 in readiness for a possible pulse from the tube 207 which would operate to energize the relay 219F in a manner as was just described with respect to relays 219D and 219E. The use and result of the attraction of the armature 241 or a similar one (other relays) will be described hereinafter.

If instead of an impulse being generated on the common conductor 218 and thence over the branching conductor and through the attracted armature of relay 219D, an impulse had been impressed on the common conductor 217 signifying that the tube 171E was conducting, transformer 198E pulsing, and the tube 207 conducting, an impulse would be impressed to alternating ones of the relays 219A to 219J, inclusive, over the branching conductors. The only effect of such pulse on the conductor 217 and its branch conductors would be the completion of an electrical circuit over the conductor 217, through the branch conductor, through the armature 242 of the relay 219C which is now in its attracted position, over a conductor 243, and through the left-hand winding of the relay 219D. However, inasmuch as the relay 219D was described as being in an energized condition such pulse and circuit would have no effect thereon. No impulse would be transmitted from common conductor 217 over the branch conductors to any other of the relays because the other relays to which such branch conductors lead would be de-energized at this time and their associated armatures (similar to 242) would not be attracted to allow a resulting circuit such as was just described.

Therefore, it may be seen that the relays 219A to 219J, inclusive, operate two at a time according to the pattern disclosed in lines 219A to 219J of Fig. 15, the next relay then becoming energized and causing the extinguishment of the first relay, with the exception that the last relay in the chain does not cause the first relay to become energized.

It may be noted that all of the relays 219A to 219J are provided with armatures similar to armature 241 of relay 219E which are connected over individual conductors 244 to the ten positions of a manually operable sequence switch indicated generally as 246 (Fig. 13). The purpose of this switch will be described hereinafter.

Figure 11:
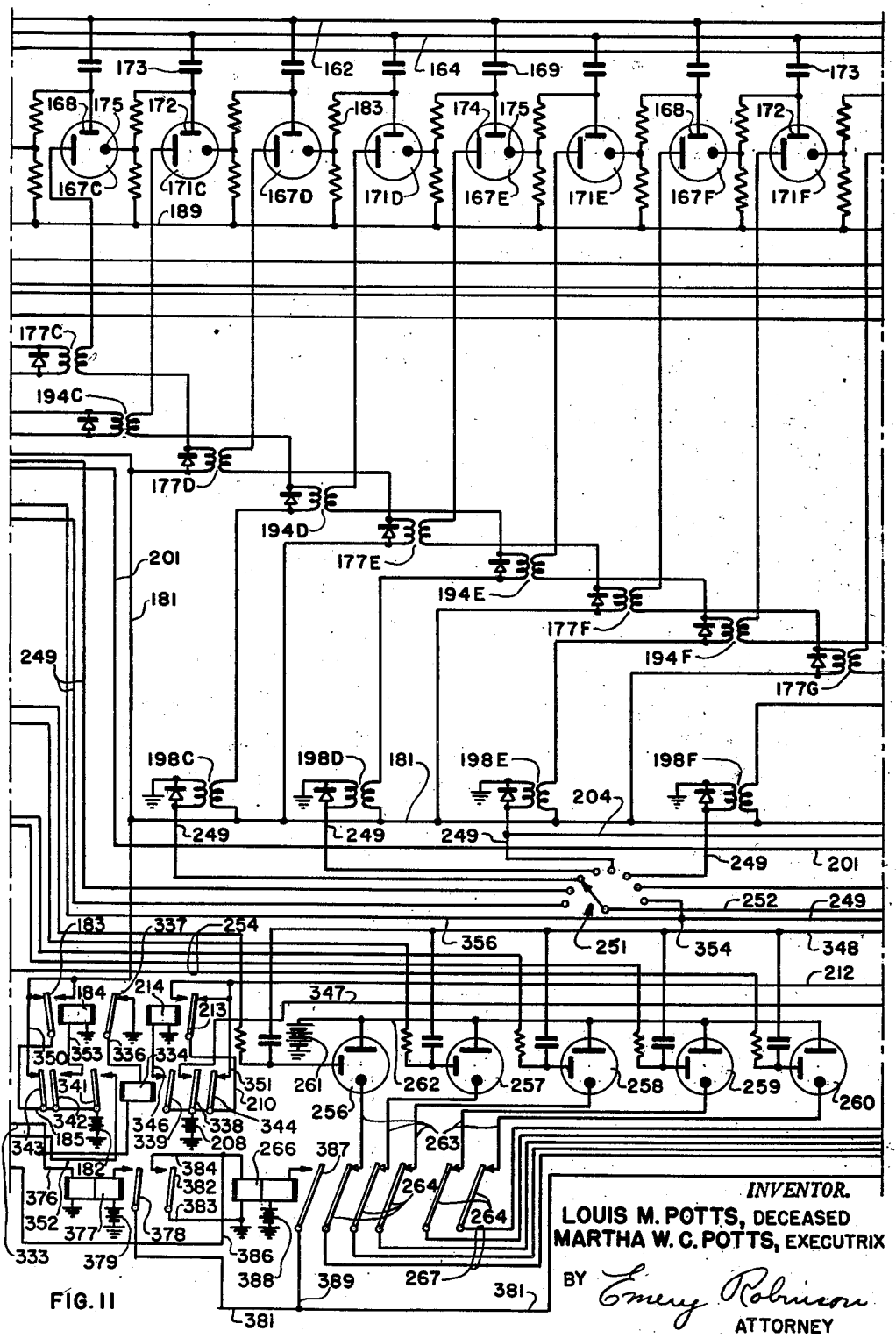
Figure 12:
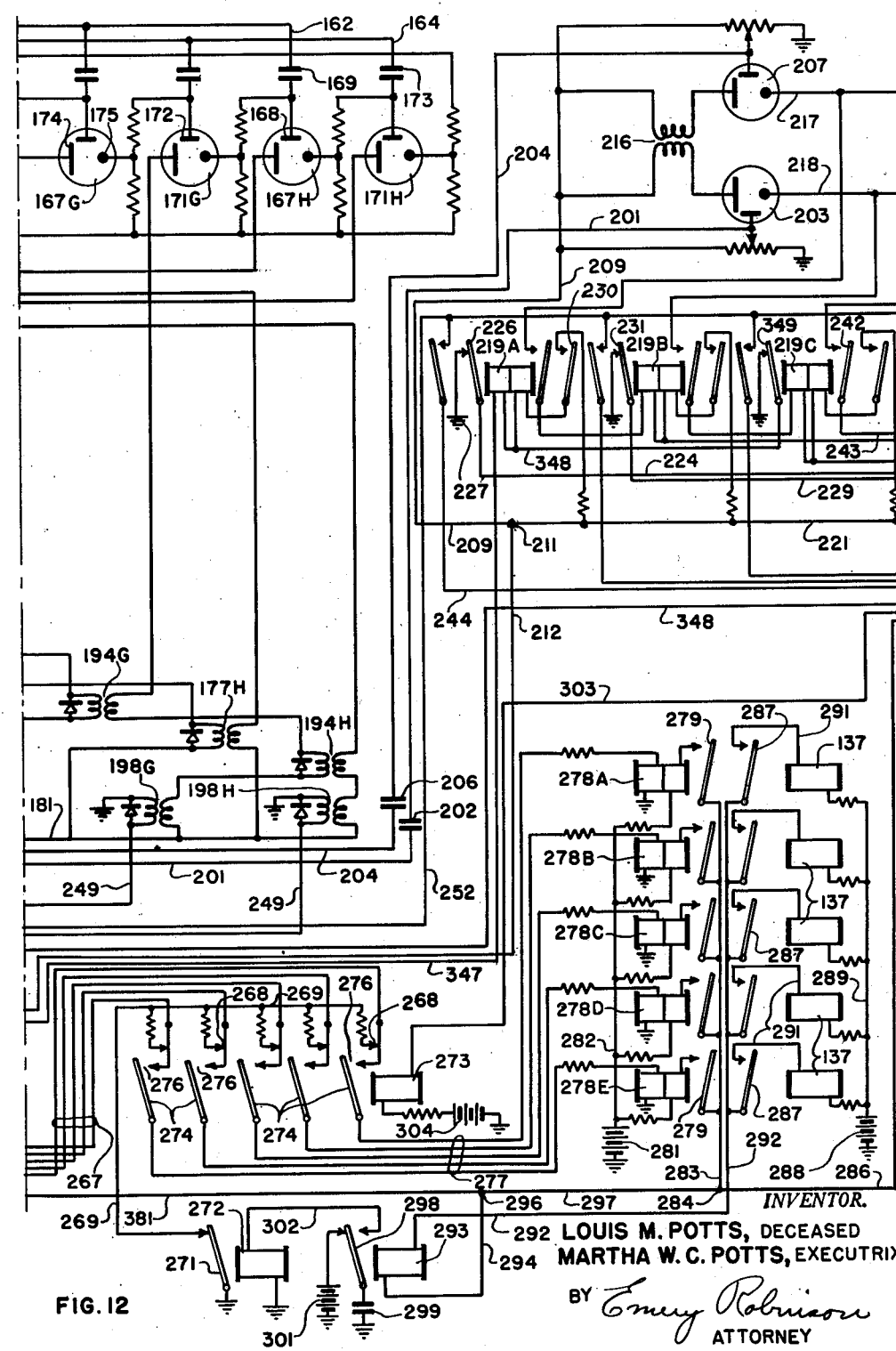

Referring now to Figs. 10, 11, and 12 it may be seen that the secondaries of the transformers 198B to 198H are connected over individual conductors 249 to the eight positions of a manually operable sequence switch indicated generally by the numeral 251. It may also be seen that the movable pointer of the sequence switch 251 is connected over a conductor 252 which acts as a common conductor and has various branch conductors which will be connected in circuit to the armatures 241 of the relays 219A to 219J, inclusive, when any of those relays are energized and such armature attracted thereto. The purpose and further use of the switch 251 will be described hereinafter.

It is to be remembered that five photocells 151 to 155, inclusive, were previously described as being biased or activated in accordance with the scanning of the five code impulse marks in a transverse row on the ticket 27. The photoelectric cells 151 to 155, inclusive, are each provided with an associated amplifier tube 253 similar to the tube 159 associated with the photocell 157 and operating in a similar manner. In the event that a black code mark is scanned on the ticket 27 corresponding to a particular photocell 151 to 155, inclusive, the associated amplifier 253 will operate to cause an impulse to be transmitted over a conductor 254 associated with each of the amplifiers to the starter anode of one of five cold cathode tubes 256 to 260, inclusive. Thus, in the event that the tubes 256 to 260, inclusive, were to receive a conditioning current at the starter anodes thereof simultaneously with potential being applied over one or more of the conductors 254, such tubes 256 to 260, inclusive, would become conducting. Thus, for example, in the event that the code impulses for the particular signal may be spacing, spacing, marking, marking, spacing, the tubes 258 and 259 would become conducting whereas the tubes 256, 257, and 260 would remain in their unconducting state. The generation of the conditioning voltage for the starter anodes of these tubes will be described hereinafter.

The anodes of the tubes 256 and 260, inclusive, are connected to grounded battery 261 by means of a common conductor 262.

The cathodes of the various tubes 256 to 260, inclusive, are connected to individual conductors 263 which, in turn, are engaged by the armatures 264 of a relay 266, provided the relay is de-energized and the armatures in their unattracted position, thence over conductors 267, through make-before-break contacts 268, over a common conductor 269, through the armature 271 of a relay 272 when the relay is de-energized and the armature unattracted, to ground.

A relay 273 is provided, Fig. 12, whose armatures 274 operate when attracted to engage associated contact points 276 which at a slightly later time causes the opening of the make-before-break contacts 268. The armatures 274 are connected by means of the conductors 277 to the left-hand winding of five relays 278A to 278E, inclusive. In the event that the relays 278A to 278E are energized, their attracted armatures 279 result in the establishment of a locking circuit which may be traced from grounded battery 281, over a common conductor 282, through the right-hand winding of the relays 278A to 278E, inclusive, through the attracted armature 279, over a common conductor 283 to a junction point 284, over a conductor 286, through the contact pair 147, normally closed, to ground. Thus, a locking circuit is supplied for the relays 278A to 278E under this condition.

The energization of any of the relays 278A to 278E results in the attraction of its associated armature 287 which results in the establishment of an electrical circuit for energizing one or more of the magnets 137. Such a circuit may be traced from grounded battery 288, over a common conductor 289, through the winding of the magnets 137, over a conductor 291, through the attracted armature 287, over a common conductor 292, through the winding of a relay 293, over a conductor 294 to junction point 296, over a conductor 297 to junction point 284, and thence over conductor 286 and through the normally closed contact pair 147 to ground.

The relay 293 is provided with an armature 298 which in its normally unattracted condition allows a grounded condenser 299 to be charged by a battery 301. At such time as the relay 293 is energized the armature 298 will be attracted thereto and a circuit will be established over conductor 302 and through the winding of relay 272 to ground. The condenser 299 will discharge at this time causing the relay 272 to become energized momentarily, resulting in its armature 271 being attracted thereto and ground being removed from the circuit previously traced through the make-before-break contacts 268 to the various tubes 256 to 260, inclusive.

It should be noted that the contact pair 146, normally open, Fig. 13, is connected by means of conductor 303 to the winding of the relay 273 and thence to grounded battery 304. Thus, at such time as the cam 142 presents its apex to the cam follower resulting in the closure of the contact pair 146, the relay 273 will be energized attracting its armatures 274 thereto.

The secondary of the transformer 198A is also connected by means of a conductor 306, through a condenser 307, to the starter anode of a cold cathode tube 308, the anode circuit of which is supplied with grounded battery 309 over a common conductor 311. The cathode circuit of the tube 308 extends over a conductor 312 and through a condenser 313 to the starter anode of a cold cathode tube 314. The cathode circuit of the tube 314 extends over a conductor 316 through a condenser to the starter anode of a cold cathode tube 317, whose cathode circuit extends, in turn, over a conductor 318 and through a condenser to another cold cathode tube 319. The cathode circuit of the tube 319 extends similarly over a conductor 321 to the starter anode of another cold tube 322. The starter anodes of the tubes 308, 314, 317, and 322 are connected by means of conductors 323 to the amplifier tubes 253 in such a manner that after one of the photocells 151, 152, 153, or 155 scans a white portion or spacing condition on the ticket 27, voltage will be impressed over the conductors 323 to the starter anodes. The starter anode of the tube 319 is connected over the conductor 254 to the associated amplifier 253 in such a manner that if the photocell 154 scans a black portion or marking condition on the ticket 27, voltage will be impressed to the starter anode of that particular tube. A triode tube 324 is provided whose grid is connected through a condenser 326 and over a conductor 327 to the common conductor 162 associated with the secondary of the transformer 161. The anode of the tube 324 is connected over an obvious conductor to the primary of a transformer 328 whose secondary is connected between the battery 309 and the common conductor 311, previously referred to. The secondary of the transformer 198H is also connected to the starter anode of the tube 308 over the conductor 249 to junction point 354 and thence over conductor 356 and through condenser 357.

A cold cathode tube 329 is also provided whose starter anode is connected to the cathode circuit of the tube 322, over an obvious circuit, and which is also connected through a condenser 331 and over a conductor 332 to the common conductor 164 associated with the secondary of the transformer 161.

The cathode circuit of the tube 329 is connected over a conductor 333, through the winding of a relay 334, over a conductor 336, and through the armature 337 of the relay 184 so that at such time as the tube 329 becomes conducting a circuit may be established from battery 309, through the tube 329, over the conductor 333, through the winding of the relay 334, over the conductor 336 and through the armature 337 of the relay 184 to ground, causing the relay 334 to energize.

The relay 334 is provided with armatures 338, 339, 341, 342, 343, and 344. At such time as the relay 334 is energized and attracts its armatures the armature 339 completes a circuit from grounded battery 208, through the armature 339, over a conductor 346, and through the winding of the relay 214, to ground, causing the relay 214 to energize.

Attraction of the armature 338 completes an electrical circuit from grounded battery 208, through the armature 338, over a conductor 347, through the left-hand winding of the relay 219A, over a conductor 348, and through the unattracted armature 349 of the relay 219C, to ground. The relay 219A will energize and lock up over a circuit similar to that traced previously for relay 219E.

The attraction of the armature 341 completes a circuit from grounded battery 182, through the armature 341, and over a conductor 352 to the starter anode of the tube 167A. Thus, if at this time the starter anode of the tube 167A also receives a pulse from the conductor 162 (and through the condenser 169) the tube 167A will conduct.

As a result of the armature 342 being attracted a circuit is established from grounded battery 182, through the armature 342, over a conductor 353, and through the winding of the relay 184 to ground, causing the relay 184 to energize.

The armature 343, upon attraction, breaks a circuit which had previously supplied grounded battery 182, through the armature 343, and over a conductor 350 to the conductor 181. The battery circuit to conductor 181 is not broken completely at this time as battery 182 is supplied over the conductor 185 to the armature 183 of the relay 184.

The attraction of the armature 344 breaks a circuit which had previously supplied battery 208 through the armature 344 to a conductor 351 and thus to the conductor 212. However, battery 208 is still supplied to the conductor 212 over the conductor 210 and through the armature 213 of the relay 214 at this time.

It should be noted, Fig. 10, that the photoelectric cell 158 previously mentioned and which scans either the black inlay portion 102 on the scanning table 101 or is prevented from scanning the black because of a ticket 27 being interspaced therebetween, is connected to an amplifier tube 362 whose output circuit passes through the winding of a relay 363 and thence to ground. The relay 363 is provided with an armature 364 which in its attracted position engages a conductor 366 and completes a circuit from ground, through the armature 364, over the conductor 366, through the winding of the magnet 124, over a conductor 367 and over a common conductor 368 to grounded battery 369, the latter of which is also supplied to the various photocells previously described.

If the armature 364 of the relay 363 is in its unattracted position signifying the relay 363 is de-energized, a circuit may be established from ground, through the armature 364, over a conductor 371, through the contact pair 149 if closed at this time, through the winding of the magnet 148, and over the conductor 367 to common conductor 368, and to grounded battery 369.

Likewise, the magnet 148 may also be energized over a circuit which may be traced from ground through normally closed contact pair 144 (when cam 141 presents its high portion to its associated follower), over a conductor 372, through the winding of the magnet 148, and thence over conductors 367 and 368 to grounded battery 369. The operation of the relay 363 and the magnets 141 and 148 will be described hereinafter.

Referring to Fig. 11, it may be seen that a conductor 376 branches from the conductor 333, previously described as in the output circuit of the tube 329, to the left-hand winding of a relay 377. Thus, at such time as the tube 329 becomes conducting a circuit is established from the output of the tube 329, over the conductor 333, over the conductor 376 and through the left-hand winding of the relay 377 to ground, thereby energizing the relay 377. The resultant attraction of an armature 378 completes a locking circuit for the relay 377 which may be traced from grounded battery 379, through the right-hand winding of the relay 377, through the armature 378, over a conductor 381 to junction point 296, and thence over the conductors 297 and 286 and through the normally closed contact pair 147 to ground.

The energization of the relay 377 also attracts its armature 382, which is connected by a conductor 383 to ground into engagement with the contact of a conductor 384 which passes through the left-hand winding of the relay 266 which is also connected to ground. The left-hand winding of the relay 266 is also connected by a conductor 386 through a condenser 385 to the primary of the transformer 328 (Fig. 10).

Thus, every time the tube 324 conducts, supplying current in the primary of the transformer 328, current will be supplied over the conductor 386 and its condenser 385, through the left-hand winding of the relay 266 to ground, with the exception, however, that if the relay 377 is energized at this time and its armature 382 attracted thereto a shunting circuit for the winding of the relay 266 exists which may be traced over conductor 384, through the armature 382, and over the conductor 383 to ground. Thus, if no shunting circuit exists (relay 377 de-energized) the relay 266 will energize when tube 324 conducts.

When relay 266 energizes it attracts its armature 387 thereto, completing a locking circuit which may be traced from grounded battery 388, through the right-hand winding of the relay 266, through the armature 387, over a conductor 389 to the conductor 381, thence to junction point 296, over conductors 297 and 286, and through the normally closed contact pair 147 to ground. During the interval that the relay 266 is energized the armatures 264, referred to previously, are also attracted.

Inasmuch as there are forty possible code positions on the individual tickets 27 and as the present apparatus is designed to sort tickets according to a single digit only during one operation thereof, it is necessary to provide means to set the apparatus so that it will respond to a particular row of code marks on the ticket only, depending upon which particular sorting operation is desired. In the event that the tickets are being sorted according to calling subscriber's numbers it would be necessary to sort the tickets four times in order to successively separate them in accordance with their four digits (assuming the exchange numbers are to be limited to four digits only). Accordingly, in order to assure proper operation with respect to a single line of coded marks only the manual switches 251 and 246 have been provided which will be set to their various points according to a predetermined pattern or table to provide scanning of a predetermined row. During the above description the operation of the tubes 167A to 167H, inclusive, and 171A to 171H, inclusive, and the relays 219A to 219J, inclusive, has been described as functioning in chain fashion under the control of the scanning of the ticket feed marks by the photocell 157. At the same time the photocells 151 to 155, inclusive, are scanning the various lines of the coded marks and if a marking impulse is recorded and scanned a potential will be impressed on the corresponding conductor 254, by the amplifier tube 253, to the starter anode of one or more of the tubes 256 to 260, inclusive. However, these latter tubes even though they have received potential signifying a marking impulse will not conduct at this time unless a conditioning voltage is impressed on the starter anodes, through the branch conductors, over the common conductor 348 which extends to the movable pointer of the manually operable switch 246. During the time of the scanning of the various rows of code marks, the various tubes 167 and 171 and the various relays 219 will be operating in chain fashion as was described previously.

Prior to a detailed description of the operation of the apparatus and system some general remarks as to the elements appears pertinent. In such description it should be remembered that the photocell 158 detects the absence or presence of a toll ticket in scanning position, whereas the photocell 157 is responsive to codal feed marks on the ticket. The photocells 151 to 155, inclusive, are utilized to scan the code signals appearing on the toll ticket, while tubes 308, 314, 317, 319 and 322 form a chain and condition the apparatus upon the scanning of the first code signal if it is correct. Chain tube and chain relay circuits are provided to serve as counting devices to insure proper operation of the system in accordance with the scanning of the various code signals, which in cooperation with manually operable switches 251 and 246 insure the setting of the selector mechanism 23 (magnets 137) at the correct transverse code signal on the toll ticket for which sorting is occurring. A series of tubes 256 to 260, inclusive, serve to store the desired code signal until transferred to the magnets 137 by operation of the relay 273. Various mechanical elements are also provided to effect the proper timing and sequence of operation, such as the cams 141, 142 and 143.

The following operational description of the apparatus will be predicated on the assumption that the apparatus is at rest with the starting switch, which is not shown, being in its "off" position. Thereafter, the stack of tickets 27 if not already in place will be positioned on the table 26 in readiness for operation. Assuming now that it is desired to operate the apparatus, the starting switch, not shown, will be positioned to its "on" position which will result among other things in the motor 31 (Fig. 1) being started into operation. Operation of the motor 31 imparts rotation to the gear 32, shaft 33, and gear 34 thereon resulting, in turn, in the conveyor 22 being started into operation through the rotation of shaft 94 and gears 96 and 92.

Upon the initiation of the apparatus, an electrical circuit is completed which may be traced, Fig. 10, from ground, through the normally closed contact pair 144 associated with the cam 141, over the conductor 372, through the winding of the magnet 148, and over the conductors 367 and 368 to grounded battery 369. The magnet 148 becomes energized attracting its armature thereto, which results in the pawl 39 being removed from engagement with the ratchet 38, thereby releasing the clutch 37 for operation and allowing the sleeve 36 to rotate with the shaft 33.

Rotation of the sleeve 36 initiates operation through gear 41 thereon of the various gearing systems, which were described previously with respect to Figs. 2 and 3, and which results in the rolls 52 and 68 rotating to pick up the uppermost of the toll tickets 27 and feed it between the rolls 68 and 62, over a suitable platform and through the rolls 77 and 78, against the guide 82 and thus to a position whereat it will be picked up by the downwardly and inwardly extending portions 88 of the conveyor lugs 87. The ticket will thus be conveyed to the scanning table 101 and thence under the scanning mechanism 24.

Prior to the time that the ticket 27 is placed in scanning position on the scanning platform 101, the photocell 158 will be scanning the black inlay portion 102 and will not be altered in its operation to cause associated amplifier tube 362 to effect operation of the relay 363. However, at such time as the ticket 27 is interposed between the light source and the scanning member associated with the photocell 158, thus blocking scanning of the black inlay portion, the photocell 158 will be biased in such a manner to cause the tube 362 to operate to cause the energization of the relay 363 over an obvious circuit. As a result of the attraction of the armature 364, an electrical circuit will be completed which may be traced from ground, through the armature 364, over the conductor 366, through the winding of the magnet 124, and over the conductors 367 and 368 to grounded battery 369, thereby energizing the magnet 124.

As magnet 124 becomes energized it attracts its armature 126 thereto, Fig. 5, resulting in the release of clutch 123 to impart driving power from the shaft 94 to the driving portion of the clutch and the shaft 127 and thence through the previously described gearing system to the selector mechanism 23, thereby rotating the discs 111. Likewise, at this time the cams 141, 142, and 143, all secured to shaft 127, will commence to rotate in a cyclic manner as will appear more fully hereinafter.

Likewise, upon the first feed mark of the ticket being scanned by the tube 157, the tubes 167 and tubes 171 will start their chain operation as has been described fully hereinbefore. It should be remembered that reference is made to the above-listed reissue patent for initiation of the tube 167A and relay 219A at this time, by a key or switch similar to the phasing keys 440, 441 and 442, described in detail starting on page 21 of that patent.

Also as the first code marks indicative of the first position on the ticket 27 is scanned by the various photocells 151 to 155, inclusive, the accompanying amplifiers 253 will be operated accordingly, resulting in impulses being generated on the conductors 254 to the starter anodes of the tubes 256 to 260, inclusive, in accordance with marking impulses and no impulses being generated on the conductors 254 if a spacing condition exists. However, the tubes 256 to 260, inclusive, will not conduct at this time inasmuch as it is necessary that a conditioning potential be applied to their starter anode over the common conductor 348 which will not happen at this time, as will be later described in detail.

As was previously described the first codal position on the ticket 27 will comprise a hyphen signal which is designated by code impulses represented as spacing, spacing, spacing, marking, and spacing conditions. Under this condition the tubes 151, 152, and 153 will generate impulses accordingly on their associated conductors 323. As a result of this and as the tube 171A will be conducting at this time, an impulse will be generated not only over the conductor 323 to the starter anode of the tube 308 but also from the secondary of the transformer 198A, over the conductor 306, through the condenser 307, and also to the starter anode of the tube 308, resulting in this tube becoming conducting.

As a result of tube 308 becoming conducting the output current thereof will be impressed over conductor 312, and through condenser 313 to the starter anode of the associated tube 314. As previously described, the No. 2 pulse was spacing resulting in the tube 152 being biased in such a manner as to impress a conditioning potential over the conductor 323 to the starter anode of the tube 314 and due to the combined voltages impressed on this starter anode the tube 314 will become conducting.

The associated tube 317 will also become conducting at this time due to potential being applied to its starter anode from the output circuit of the tube 314 and from the photocell 153 and associated amplifier tube 253 all as has been previously described.

The output circuit of the tube 317 as traced over conductor 318 will apply potential to the starter anode of the tube 319. However, in this case a marking rather than spacing impulse is being scanned on the ticket and, therefore, photocell 154 and amplifier tube 253 will cause an impulse to be generated on the lead 254, also to the starter anode of the tube 319, thereby causing the tube to become conducting.

Inasmuch as the 5th code impulse is again spacing, potential will be generated through its scanning similarly as described with respect to the first three tubes 308, 314, and 317 and will also be impressed on the starter anode of the tube 322 from the output circuit of the tube 319, thereby resulting in tube 322 becoming conducting.

The output circuit of the tube 322 now conducting will be applied to the starter anode of tube 329. Simultaneously with this and as the cell 157 scans the change from feed mark to interposed white portion of the ticket, an impulse will be generated over the conductor 164, over the conductor 332, through the condenser 331, and to the starter anode of the tube 329, thereby causing this tube to become conducting.

As tube 329 conducts it completes a circuit which may be traced from grounded battery 309, through the tube 329, over a conductor 333, through the winding of the relay 334, over the conductor 336, and through the armature 337 to ground, causing the relay 334 to energize.

The energization of the relay 334 results in all of its armatures 338, 339, 341, 342, 343, and 344 being attracted thereto. The attraction of the armatures 339 and 342 results in the energization of the slow-to-operate relays 214 and 184, over circuits described previously.

Before the operation of the slow acting relays the movement of the armature 338 results in a circuit being established from battery 208, through the armature 338, over the conductor 347, through the left-hand winding of the relay 219A, over conductor 348 and through the armature 349 of relay 219C to ground, causing a locking circuit to be set up for relay 219A through its armature 230, all as has been described. The relay chain is thus in readiness for operation.

Also prior to the operation of the slow acting relays the attraction of the armature 341 causes a circiut to be established which may be traced from battery 182, through the armature 341, and over the conductor 352 to the starter anode of the tube 167A. As during the time the relay 334 is energized the tube 159 will generate an impulse on the conductor 162 the starter anode 168 will receive sufficient voltage to allow the tube 167A to become conducting, thus readying the tube circuit for operation.

Likewise, prior to the operation of the slow acting relays the armature 344 will be attracted, thus removing the battery 208 from the conductor 212 by way of the conductor 351, but not affecting the battery 208 supplied thereto over the conductor 210 and the armature 213.

Similarly to above, the attraction of the armature 343 removes battery 182 from the conductor 181 by way of the conductor 350, but does not affect the battery 182 supplied from the conductor 185 and the armature 183.

The slow-to-operate relays 184 and 214 then energize resulting in their armatures being attracted thereto. The attraction of the armature 337 breaks the ground potential supplied previously over the conductor 336 for the relay 334 thereby causing this latter relay to de-energize.

Prior to the de-energization of the relay 334, however, the armature 183 moves from its contact, thereby preventing battery 182 from being supplied to the conductor 181 by way of the conductor 185 and armature 183, and as armature 343 of the relay 334 will be away from its contact at this time no battery at all will be supplied to the conductor 181 at this time. Inasmuch as the conductor 181 is the source of potential for the tube circuits, tube 167B to 167H, inclusive, and 171A to 171H, inclusive, any one of these which may have been conducting at this time will be extinguished. The tube 167A will remain conducting at this time as it has a separate source of potential, battery 186.

Upon the armature 213 of relay 214 being attracted the circuit for supplying battery 208 to conductor 212 by way of the conductor 210 and the armature 213 is broken. As armature 344 of relay 334 is away from its contact also, no battery at all will be supplied to the conductor 212, resulting in all of the relays 219B to 219J, inclusive, which may have been energized becoming de-energized due to a loss of locking potential. As the relay 219A is supplied with potential from battery 208 over conductor 347, as described above, it will remain energized.

The removal of potential from the conductors 181 and 212 will be only momentarily, as the armatures 183 and 213 will move from their one contact point to a second one, re-establishing the circuits. However, the circuits are open for a sufficient period of time to allow the tubes and relays to extinguish and de-energize, as described.

As mentioned above, the ground for relay 334 was removed upon relay 184 energizing. The relay 334 thus de-energizes, allowing all of its armatures to resume their normal unoperated positions. The armatures 339 and 342 thus no longer establish energizing circuits for the relays 214 and 184, respectively.

Prior to the de-energization of the slow-to-operate relays the armature 344 will re-establish the circuit from battery 208 over the conductor 351 to the conductor 212, thus allowing locking potential to be supplied for the relays 219A to 219J, inclusive. The relay 219A will remain energized, despite the potential supplied thereto prior to the movement of the armature 338 at this time.

Similarly, the movement of the armature 341 merely removes potential from the battery 182 over the conductor 352 to the starter anode 168 of the tube 167A, but as this tube is already conducting, receiving potential from the battery 186, it has no effect at this time. Likewise, the movement of the armature 343 reestablishes the supply of potential from battery 182 to the conductor 181 (for tubes 167B to 167H and 171A to 171H) over the conductor 350.

The slow operating relays 184 and 214 now de-energize, allowing their armatures 183 and 213, respectively, to resume their normal unattracted positions. The circuits from batteries 182 and 208 will again be broken momentarily at the armatures 183 and 213, but as the armatures 343 and 344 (relay 334) are in their normal positions potential to the conductors 181 and 212 is not affected.

The de-energization of the relay 184 allows its armature 337 to complete the ground circuit for the relay 334 once again, but this relay will not energize again at this time for a reason to be now described. As the impulse was generated on the conductor 162 it was transmitted by the conductor 327 and through the condenser 326 to the grid of the tube 324, causing this tube to conduct. The output circuit of the tube 324 operates the transformer 328 in such a manner to reverse the potential on the common conductor 311, thereby causing the tubes 308, 314, 317, 319, and 322 to be extinguished. As the tube 329 was extinguished at the time ground was removed at the armature 337, and as there is now no conditioning potential from the output of the tube 322, the relay 334 will not again energize at this time.

During the interval that the tube 329 was conducting a circuit was established from the output of the tube, over the conductor 333, over the branching conductor 376, and through the left-hand winding of the relay 377 to ground, causing the relay 377 to energize. The subsequent attraction of the armature 382 completes a shunt circuit between ground and the conductors 384 and 383. Thus, as an impulse is received from the tube 324 and the condenser 385 over the conductor 386 from the primary of the transformer 328 it will not pass through the winding of the relay 266 but instead will go to ground over the shunt circuit.

The attraction of the armature 378 by the relay 377 establishes a relay locking circuit from battery 379, over the conductor 381 to junction point 296, thence over the conductors 297 and 286, and through the normally closed contacts 147 to ground. Thus, as the relay 377 remains energized the shunt circuit remains, thus preventing the relay 266 from energizing despite continued impulses over the conductor 386 in accordance with the conductors 162 and 327, as illustrated as line 163 of Fig. 15.

As the second position code impulses are scanned by the photocells 151 to 155, the tubes 308, 314, 317, 319, and 322 will attempt to operate similarly as described above. However, inasmuch as the code signal happens to be other than that of a hyphen the tubes will not function as previously described, resulting in the conducting of the tube 329. Such is prevented because due to the output circuit of one tube applying conditioning voltage to the starter anode of the succeeding tube which causes conducting of the tube when accompanied by a spacing condition in the Nos. 1, 2, 3, and 5 positions and a marking condition in the No. 4 position, the tubes will only operate in response to such signals indicative of a hyphen. However, inasmuch as the first four or less of the tubes may become conducting during the scanning operation, the tube 324 will operate invariably to cause the extinguishment thereof prior to the recording of the next code signal. Further, as tube 308 receives a conditioning potential from the transformers 198A and 198H, the tubes 308, etc., may not become conducting until a concluding mark on the ticket, as will be described.

Shortly after the shaft 127 is released for operation the high portion of the cam 141 will no longer be presented to its associated follower, thereby resulting in the contact pair 144 opening. As a result of this, ground will no longer be applied for the energization of the magnet 148 over the conductor 372, and as the armature 364 is held attracted by the energized relay 363 during the length of time that a ticket is scanned thereby precluding ground from being applied over the conductor 371, the magnet 148 will de-energize, thereby causing its armature pawl 39 to engage the ratchet 38 thereby disengaging the clutch 37 and precluding further rotation of the sleeve 36. As a result of this the ticket feeding apparatus, as exemplified by the gearing of the pickup mechanism 21, will be precluded from further operation until such time as the cam 141 again closes contact pair 144 or the ticket 27 moves from scanning position and the relay 363 de-energizes.

The following description will proceed on the assumption that it is desired to scan the 27th transverse row of coded marks on the ticket 27 being scanned and that in order to provide for the scanning of this row, the manually operable switch 251 (Fig. 11) has been positioned on its No. 3 contact point as shown and the manually operable switch 246 (Fig. 13) has been positioned on its 6th position as shown.

By reference to line 391, Fig. 15, it may be seen that under this condition the tube 171C will be conducting and the transformer 194C will impress a potential on conductor 249, through transformer 198C, by referring back to line 171C. It might be noted at this point that the various pulse lines illustrated in Fig. 15 are obtained by charting the actual periods of operation of their associated elements, such as tubes and relays, in the contemplated operation of the system. The pulses illustrated as line 391 of Fig. 15 are determined, under the assumed settings of the switches 251 and 246, by tracing the circuits established by such settings and then determining from the other lines of Fig. 15 the times at which the tubes and relays in such circuits will be operating. Such has been indicated on line 391 by the dotted portion 171C.

The above circuit may be further traced from conductor 249 leading from transformer 198C, through the movable pointer associated with the manually operable switch 251, over the conductor 252 and over the branching conductors and through any of the armatures such as 241 associated with the relay 219A to 219J which may be energized at this time. By reference to lines 219A to 219J, Fig. 15, indicative of the energized period of the relays 219A to 219J, inclusive, respectively, it may be seen that the relay which is energized during the time of the impulse exemplified by the dotted portion 171C and falling within the 27th position will be the relay having the operating period 219F which corresponds to relay 219F, which period has been reproduced on line 391 and indicated as portion 219F. Thus, the circuit from the conductor 252 extending to manual switch 251 may be further traced through an attracted armature 241 associated with the relay 219F, over a conductor 244, and thence to the No. 6 contact point of the manually positionable switch 246. Inasmuch as the pointer has been assumed to be positioned on the 6th point the circuit may be further traced over the conductor 348 to the starter anodes of the cold cathode tubes 256 to 260, inclusive.

It must be remembered that during the time that the tubes and relays were stepping to their position under scanning of the associated ticket feed mark associated with the 27th transverse row of code markings, photocells 151 to 155, inclusive, had scanned the number code marks and impressed potential indicative of marking impulses through the amplifiers 253 and over the conductors 254 to the starter anodes of the tubes 256 to 260, inclusive, associated with a marking impulse in that particular impulse position. Likewise, all of the tubes 151 to 155, inclusive, which scanned a white portion or spacing impulse did not impress potential through the associated tube 253 and associated conductor 254 to the starter anodes of the tubes 256 to 260.

Thus, when the tubes 256 to 260 have potential applied to their starter anodes in accordance with the marking indications on the ticket and are simultaneously conditioned by the potential applied over the conductor 348 to the starter anodes, these tubes will conduct indicating a marking condition.

Such of those tubes 256 to 260 which conduct, complete electrical circuits previously traced from battery 261, over the common conductor 262, through the particular tubes, over the conductors 263, through the unattracted armatures 264, over the conductors 267, through the make-before-break contacts 268, over the common conductor 269, and through the unattracted armature 271 of relay 272 to ground. Thus, the particular tubes indicative of the marking condition which have become conducting will continue to conduct until extinguished as will be described later.

Near the end of the cyclic rotation of the shaft 127 the cam 142 will present its apex to its associated follower resulting in the momentary closure of the contact pair 146. As a result of this a circuit is completed which may be traced from ground, through the contact pair 146, over the conductor 303, and through the winding of the relay 273 to grounded battery 304. Relay 273 energizes causing its associated armatures 274 to be attracted thereto which engage their associated contacts 276 prior to opening the make-before-break contacts 268.

At this time the circuits which had previously been traced from the conducting tubes 256 to 260, inclusive, conducting in accordance with the code signals scanned, will complete their circuits not through the common conductor 269 to ground, but instead through the armatures 274, over the conductors 277 and through the left-hand winding of the relays 278A to 278E to ground. The energized relays 278A to 278E immediately lock up over a circuit including their associated armatures 279 in a manner as has been previously described. Such latter occurrence is necessary inasmuch as, as mentioned, the period of energization of the relay 273 is momentary only and the armatures 274 will immediately drop away from the contacts 276.

Any of the relays 278A to 278E which energize will, through the attraction of their associated armatures 287 result in the associated magnets 137 likewise becoming energized and locking up over a circuit including the winding of the relay 293, as described previously.

As the relay 293 becomes energized and attracts its armature 298 the charged condenser 299 will discharge resulting in the relay 272 becoming energized momentarily. Such momentary energization of relay 272 causes its armature 271 to be attracted thereto, removing ground from the circuit which had previously been traced over the common conductor 269 and through the make-before-break contacts 268, eventually leading to the tubes 256 to 260 which were conducting, thereby resulting in the extinguishment of such tubes. Even though the armature 298 will be held attracted by its energized relay 293, the relay 272 will only be energized for an interval of time equal to the length of the discharge of the condenser 299. Such being the case, the armature 271 will almost immediately return to engagement with the conductor 269, thereby allowing the conditioning of the circuit for the conducting of tubes 256 to 260, inclusive, in accordance with the next code signal scanned.

Any of the magnets 137 which become energized will cause their associated selector bars 136, Fig. 1, to be attracted thereto, causing the code notches 138 to be aligned for one particular disc 111 only. Thus, due to the fact that the shaft 127 is still rotating the selector mechanism 23, a settable member 113 will be allowed to pass through the aligned notches 138 with its lug 117 outwardly for the disc 111 only which is indicative of the code signal scanned. All other of the elements 113 associated with the other nine discs 111 will be positioned by engaging the selector bars 136 to a position whereat they will not have a lug 117 extending outwardly, all as has been previously described.

Shortly after the signal has been transferred to the selector mechanism 23, the cam 143, Fig. 13, will present its apex to its associated follower thereby resulting in the contact pair 147 being opened and ground being removed from the circuit which previously was traced over the conductor 286 and which resulted in the energization of the relay 293 and the locking circuit for the magnets 137. Upon the relay 293 de-energizing the armature 298 will fall away therefrom completing a circuit with grounded battery 301, thereby allowing the condenser 299 to recharge. The magnets 137 will likewise de-energize resulting in their resuming a normal condition awaiting re-energization in accordance with a new signal as stored in the tubes 256 to 260, inclusive. Likewise, at this time the locking circuit for the relay 377 will be broken the relay de-energizing and breaking the shunt circuit at the armature 382. The relay 377 is now in readiness to be energized if the first character on the next ticket to be scanned is a hyphen, similarly as described.

It should be noted that in the previous description it was indicated that the manually operable switch 251 was set on its No. 3 point in order that the circuit could be completed for the conditioning voltage to the tubes 256 to 260, during the time that the 27th line of code signals was being scanned on the ticket 27. It should be noted by reference to line 391 of Fig. 15, that the tube 171B and the transformer 194B are generating pulses which are indicated by the dotted portions 171B on line 391. Thus, if the manually operable switch 251 were to be placed on its No. 2 contact point instead of its No. 3 contact point, a circuit coinciding with the 27th code position would be completed for generating a conditioning voltage for the tubes 256 to 260, inclusive. Thus for each of the forty code positions on the ticket there are two possible manual selections of the switches 251 and/or 246. However, it is suggested that the setting be made that will place the code selected by switch 251 nearer the middle of a group of eight impulses selected by the contact pointer of switch 246 than the other setting inasmuch as this will result in a better margin of operation.

As an example, line 392 has been included on Fig. 15, showing the timing so as to complete a tube conditioning circuit during the scanning of the 7th position of the code on the toll ticket. Under this condition the switch 251 may be positioned on either its No. 6 or No. 7 contact point whereas the switch 246 must be positioned on its No. 1 contact point.

As the ticket continues to be scanned the last signal scanned will be that of a hyphen which will result in the apparatus being restored to a condition similar to that described initially or just prior to the advancing of a ticket to scanning position.

As the ticket being scanned passes from the platform 101 the relay 363 under the control of photocell 158 and amplifying tube 362 (Fig. 1) will de-energize resulting in the circuit for the energization of the magnet 148 being established, thereby causing the ratchet 38 to be released and the pickup mechanism 21 to function to feed another ticket for scanning.

Due to the cyclic operation of the scanning and release of the shaft 127 for setting the selector mechanism 23, a ticket, previously scanned, will be conveyed over its predetermined discharge bin at the same time as the selector disc 111 indicative of that bin has moved sufficiently to cause its settable member 113 having extending lug 117 to close its associated contact pair 139, thereby causing energization of the storage bin control magnet 99, resulting in the armature being attracted and the lid 98 opened, the ticket falling therein.

The above apparatus which has been described in detail may be reset to different points in order that the same tickets may be run through the apparatus several times in order to sort into individual subscriber's tickets, by changing of the switches 251 and 246 so as to get four consecutive sorting operations in accordance with the calling subscriber's number.

It is obvious, however, that the tickets may be sorted selectively for any information borne thereon in accordance with any selecting plan by proper setting of the sequence switches 246 and 251. It might be noted that in the event that a hyphen had not been the initial signal, the following would occur. With reference to Figs. 10 and 11, the (hyphen) tube 329 will not become conducting, and thus no impulse will be generated over the conductor 333 and the relays 334 and 377 will not energize. At such time as an impulse is generated over the conductor 162, from the transformer 161 and the tube 159, resulting in the tube 324 conducting, potential will be applied over the conductor 386. As the relay 377 is now not energized, and its armature 382 not attracted, no shunt circuits will be set up over the conductors 383 and 384, but instead the above-referred to potential will be applied through the left-hand winding of the relay 266 to ground, energizing the relay 266. The subsequent attraction of the armature 387 will complete a locking circuit for the relay 266 which may be traced from battery 388, through the right-hand winding of the relay 266, through the armature 387, over conductors 389, 331, 297, 286, and through the normally closed contact pair 147 to ground.

The energization of the relay 266 will also cause the armatures 264 to be attracted, thereby precluding the establishment of any conducting circuit for the tubes 256 to 260, inclusive. In this manner no code signal may be transferred from the ticket 27 to the magnets 137, Fig. 12, for operating the code bars and setting the sorting mechanism. An end bin having no cover may be provided for tickets which fall within this category, or the relay 266 may operate a lid of a special bin for collecting such tickets.

After the ticket is scanned and at such time as the cam 143 causes the contact pair 147 to open the locking battery will be removed from the relay 266 and it will deenergize, thus being in readiness for the scanning of the next ticket.

Although a specific embodiment of the invention has been shown and described, it will be understood that this embodiment is but illustrative and that various modifications may be made therein without departing from the scope and spirit of the invention.

What is claimed is:

1. In a ticket sorting system for separating tickets each bearing coded designations and feed designations, means for scanning the coded designations, a chain tube system, a chain relay system, means for sorting the tickets into separate groups in accordance with the operation of said scanning means and under the control of said chain tube and said chain relay systems, and means for scanning the feed designations and controlling the operation of said chain tube system and said chain relay system in accordance therewith.

2. In a system for sorting records in accordance with indicia thereon and which are also provided with feed designations, means for scanning the indicia successively, means for scanning the feed designations, selector mechanism, means responsive jointly to said indicia scanning means and said feed designation scanning means for setting said selector mechanism, means controlled by said selector mechanism for sorting said records into separate groups in accordance with the indicia scanned, and auxiliary scanning means for determining the presence or absence of a record for releasing said sorting means for operation.

3. In a ticket sorting system for separating tickets each bearing coded designations and feed designations, means for scanning the coded designations, a chain tube system, a chain relay system, means for sorting the tickets into separate groups in accordance with the operation of said scanning means and under the control of said chain tube and chain relay systems, means for scanning the feed designations and controlling the operation of said chain tube system and said chain relay system in accordance therewith, and auxiliary scanning means for determining the presence or absence of a ticket for causing the operation of said sorting means.

4. In a ticket sorting system for separating tickets each bearing coded designations and feed designations, means for scanning the coded designations, means for conveying the tickets past said scanning means, a chain tube system, a chain relay system, means for sorting the tickets into separate groups in accordance with the operation of said scanning means and under the control of said chain tube and said chain relay systems, means for scanning the feed designations and controlling the operation of said chain tube system and said chain relay system in accordance therewith, and auxiliary scanning means for determining the presence or absence of a ticket for causing the operation of said conveying means.

5. In a system for sorting records bearing a plurality of coded designations thereon, means to scan successively the coded designations, means for conveying the records past said scanning means, selector mechanism, means responsive to said scanning means for setting said selector mechanism permutably, means controlled by said selector mechanism for sorting said records into separate groups in accordance with the coded designations scanned thereon, auxiliary scanning means for determining the presence or absence of a record, means responsive to the auxiliary scanning means for causing the operation of said conveying means, and means controlled by said auxiliary scanning means for releasing said sorting means for operation.

MARTHA W. C. POTTS.

*Executrix Under the Last Will and Testament of Louis M. Potts, Deceased.*

(References on following page)

REFERENCES CITED

The following references are of record in the file of this patent:

UNITED STATES PATENTS

| Number | Name | Date |
|---|---|---|
| 1,315,370 | Lasker | Sept. 9, 1919 |
| 1,502,993 | Lasker | July 29, 1924 |
| 1,651,180 | Bryce | Nov. 29, 1927 |
| 2,025,602 | Maul | Dec. 24, 1935 |
| 2,328,671 | Pfleger | Sept. 7, 1943 |
| 2,358,051 | Broido | Sept. 12, 1944 |
| 2,369,794 | Phinney | Feb. 20, 1945 |
| 2,408,086 | Meacham | Sept. 24, 1946 |
| 2,422,583 | Mumma | June 17, 1947 |

FOREIGN PATENTS

| Number | Country | Date |
|---|---|---|
| 256,223 | Great Britain | Sept. 1, 1927 |